United States Patent
Faulkner

(10) Patent No.: US 11,756,293 B2
(45) Date of Patent: Sep. 12, 2023

(54) INTELLIGENT AGENTS FOR MANAGING DATA ASSOCIATED WITH THREE-DIMENSIONAL OBJECTS

(71) Applicant: MICROSOFT TECHNOLOGY LICENSING, LLC, Redmond, WA (US)

(72) Inventor: Jason Thomas Faulkner, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/666,524

(22) Filed: Feb. 7, 2022

(65) Prior Publication Data
US 2022/0165059 A1    May 26, 2022

Related U.S. Application Data

(63) Continuation of application No. 17/202,324, filed on Mar. 15, 2021, now Pat. No. 11,468,672, which is a
(Continued)

(51) Int. Cl.
*G06V 20/20*    (2022.01)
*G06T 7/50*    (2017.01)
(Continued)

(52) U.S. Cl.
CPC .......... *G06V 20/20* (2022.01); *G06F 16/5866* (2019.01); *G06T 7/50* (2017.01);
(Continued)

(58) Field of Classification Search
CPC ....... G06K 9/00671; G06T 7/50; G06T 19/20; G06T 19/006; G06T 2207/1002; G06F 16/5866
See application file for complete search history.

(56) References Cited

U.S. PATENT DOCUMENTS

2010/0321540 A1* 12/2010 Woo ............... G06T 19/006
                                                                  348/241
2011/0199389 A1*  8/2011 Lu ................. H04N 19/132
                                                                  345/619

(Continued)

OTHER PUBLICATIONS

Dazhong Wu, "Cloud-based design and manufacturing: A new paradigm in digital manufacturing and design innovation," Jul. 16, 2014,Computer-Aided Design,Computer-Aided Design 59 (2015),pp. 1-12.*

(Continued)

*Primary Examiner* — Omar S Ismail
(74) *Attorney, Agent, or Firm* — Scott Y. Shigeta; Newport IP, LLC

(57) ABSTRACT

The techniques disclosed herein improve the efficiency of a system by providing intelligent agents for managing data associated with objects that are displayed within mixed-reality and virtual-reality collaboration environments and facilitating communication between the agents and computing devices associated with the collaboration environments. Individual agents are configured to collect, analyze, and store data associated with individual objects in a database associated with the agent. The agents are further configured to receive queries from the computing devices regarding an individual object. Agents can respond to queries by presenting relevant information collected by the agent with a view of the queried object of interest In addition, the data stored by the agents can be shared between different collaboration environments without requiring users to manually store and present a collection of content for each object. The intelligent agents can also persist across multiple collaboration environments to enhance user engagement and improve productivity.

20 Claims, 13 Drawing Sheets

Related U.S. Application Data continuation of application No. 16/213,867, filed on Dec. 7, 2018, now Pat. No. 10,970,547.

(51) Int. Cl.
*G06F 16/58* (2019.01)
*G06T 19/20* (2011.01)
*G06T 19/00* (2011.01)

(52) U.S. Cl.
CPC ............ *G06T 19/006* (2013.01); *G06T 19/20* (2013.01); *G06T 2207/10028* (2013.01)

(56) References Cited

U.S. PATENT DOCUMENTS

| | | | | |
|---|---|---|---|---|
| 2013/0050432 A1* | 2/2013 | Perez | ................. | G06F 3/011 348/47 |
| 2013/0293468 A1* | 11/2013 | Perez | ................. | G06F 3/033 345/158 |
| 2014/0306866 A1* | 10/2014 | Miller | ................. | G06T 7/73 345/8 |
| 2015/0268058 A1* | 9/2015 | Samarasekera | ...... | G06V 10/811 701/409 |
| 2016/0026253 A1* | 1/2016 | Bradski | ................. | H04N 13/128 345/8 |
| 2017/0147154 A1* | 5/2017 | Steiner | ................. | G06F 3/013 |
| 2018/0075643 A1* | 3/2018 | Sequeira | ................. | G01S 7/4808 |
| 2018/0341811 A1* | 11/2018 | Bendale | ................. | G06V 20/70 |
| 2019/0144114 A1* | 5/2019 | Chen | ................. | B64C 39/024 701/2 |
| 2019/0253724 A1* | 8/2019 | Nelson | ................. | H04N 19/27 |

OTHER PUBLICATIONS

Mahmoud Haydar, "Virtual and augmented reality for cultural computing and heritage: a case study of virtual exploration of underwater archaeological sites," Oct. 29, 2010,Virtual Reality (2011) 15:311-327,DOI 10.1007/s10055-010-0176-4,pp. 312-321.*
Hakan Tüzün, "The effects of computer games on primary school students' achievement and motivation in geography learning," Jun. 24, 2008,Computers & Education 52 (2009),ScienceDirect,pp. 69-71.*
X.Wang . "Real-virtual components interaction for assembly simulation and planning", Mar. 25, 2016, Robotics and Computer-Integrated Manufacturing41(2016)102-114, pp. 103-113.*
"Notice of Allowance Issued in U.S. Appl. No. 17/202,324", dated Jun. 7, 2022, 10 Pages.
"Non Final Office Action Issued in U.S. Appl. No. 17/202,324", dated Feb. 24, 2022,21 Pages.
"Notice of Allowance Issued in European Patent Application No. 19831957.6", dated Mar. 1, 2023, 6 Pages.
"Office Action Issued in Indian Patent Application No. 202147026012", dated Jan. 13, 2023, 7 Pages.
"Notice of Allowance Issued in European Patent Application No. 19831957.6", dated Apr. 25, 2023, 6 Pages.

* cited by examiner

INTELLIGENT AGENTS FOR MANAGING DATA ASSOCIATED WITH THREE-DIMENSIONAL OBJECTS

PRIORITY INFORMATION

This application claims the benefit of and priority to U.S. patent application Ser. No. 17/202,324 filed Mar. 15, 2021 and entitled "INTELLIGENT AGENTS FOR MANAGING DATA ASSOCIATED WITH THREE-DIMENSIONAL OBJECTS" which is a continuation of U.S. Pat. No. 10,970,547, application Ser. No. 16/213,867 filed Dec. 7, 2018 and entitled "INTELLIGENT AGENTS FOR MANAGING DATA ASSOCIATED WITH THREE-DIMENSIONAL OBJECTS," the entire contents of which are incorporated herein by reference.

BACKGROUND

Many productivity applications provide specialized tools for displaying and manipulating the contents of a file. Some productivity applications also provide a shared workspace where multiple users can simultaneously view and edit the contents of a file from separate locations. Some systems also allow multiple users to collaboratively edit content using devices that provide virtual reality ("VR") and mixed reality ("MR") environments.

Although current technologies can provide specialized functions for sharing and manipulating content, some existing applications do not provide a satisfactory user experience when a user wishes to retrieve data or content from one or multiple shared workspaces to prepare a visual preview or synthesize information. For example, when group consensus is needed, users may have to manually prepare specialized content to allow other users to visualize each idea. A visual preview of each proposed idea can be helpful for the participants to gain an understanding or appreciation for each idea. However, the manual process of preparing each preview can be time consuming and inefficient when it comes to computing resources, e.g., memory resources, processing resources, network resources, etc.

In addition, when users collaborate using one forum, such as a group editing session using a Skype session, then switch to another forum, such as a private chat session, not all edited content can be transferred between the different types of sessions. This shortcoming can lead to other inefficiencies with respect to computing resources as users may be required to retrieve, transfer, or even re-create content each time they transition between different types of communication sessions.

SUMMARY

The techniques disclosed herein improve the efficiency of a system by providing intelligent agents for managing data associated with real-world objects and virtual objects that are displayed within collaborative environments and facilitating communication between the agents and a group of computing devices associated with the collaborative environments. Individual agents are configured to collect, analyze, and store data associated with individual objects in a database associated with the agent. The agents can identify real-world objects and virtual objects discussed in a meeting, collect information about each object and receive user queries regarding an object. The agents are further configured to respond to user queries by presenting relevant information about the object. In addition, data stored by the agents can be shared between different communication sessions without requiring users to manually store and present a collection of content for each object. The intelligent agents can also persist through different communication sessions to enhance user engagement and improve productivity.

For example, if a first group of users is conducting a Skype meeting about a car engine design, an intelligent agent can be instantiated for each part of the engine. The intelligent agent can monitor all types of user activity during a multi-user communication session, e.g., polling, edits, text chats, and voice conversations. Data derived from the monitored activity can be displayed and stored in association with each object, e.g., each engine part. The agents are configured such that, when the Skype meeting ends, the agents and the stored data persist beyond the communication session. Thus, the agents allow users to access the agents and the stored data when new communication channels, e.g., private chat sessions or new meetings, are created.

Each agent can receive and respond to queries regarding individual objects. The queries can be interpreted from communication data generated by various users such as emails, text messages, audio data, video calls and so forth. Individual agents can respond to queries by retrieving stored data from an associated database and presenting the data to the users along with a view of the object in question. Data defining the queries and stored data associated with each object can also be stored persistently across communication sessions. Thus, when an object, such as an engine part, is moved or deleted during a session, the associated queries and stored data are modified and persist across other communication sessions to indicate such changes.

The intelligent agents provide a number of features that improve existing computers. For instance, computing resources such as processor cycles, memory, network bandwidth, and power, are used more efficiently as users transition between different sessions. Data or content does not need to be re-created for users to share and display content between sessions. In addition, facilitating communication between computing devices associated with various users and the intelligent agents enables users to make more efficient decisions and streamlines the user experience by readily supplying relevant information for individual objects managed by the agents. The techniques disclosed herein also improve user interaction with various types of computing devices. Improvement of user interaction, or the reduction of a need for user input, can mitigate inadvertent inputs, redundant inputs, and other types of user interactions that utilize computing resources. Other technical benefits not specifically mentioned herein can also be realized through implementations of the disclosed subject matter.

Those skilled in the art will also appreciate that aspects of the subject matter described herein can be practiced on or in conjunction with other computer system configurations beyond those specifically described herein, including multiprocessor systems, microprocessor-based or programmable consumer electronics, AR, VR, and MR devices, video game devices, handheld computers, smartphones, smart televisions, self-driving vehicles, smart watches, e-readers, tablet computing devices, special-purpose hardware devices, networked appliances, and other devices.

Features and technical benefits other than those explicitly described above will be apparent from a reading of the following Detailed Description and a review of the associated drawings. This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items. References made to individual items of a plurality of items can use a reference number with a letter of a sequence of letters to refer to each individual item. Generic references to the items may use the specific reference number without the sequence of letters.

DETAILED DESCRIPTION

Figure 1:
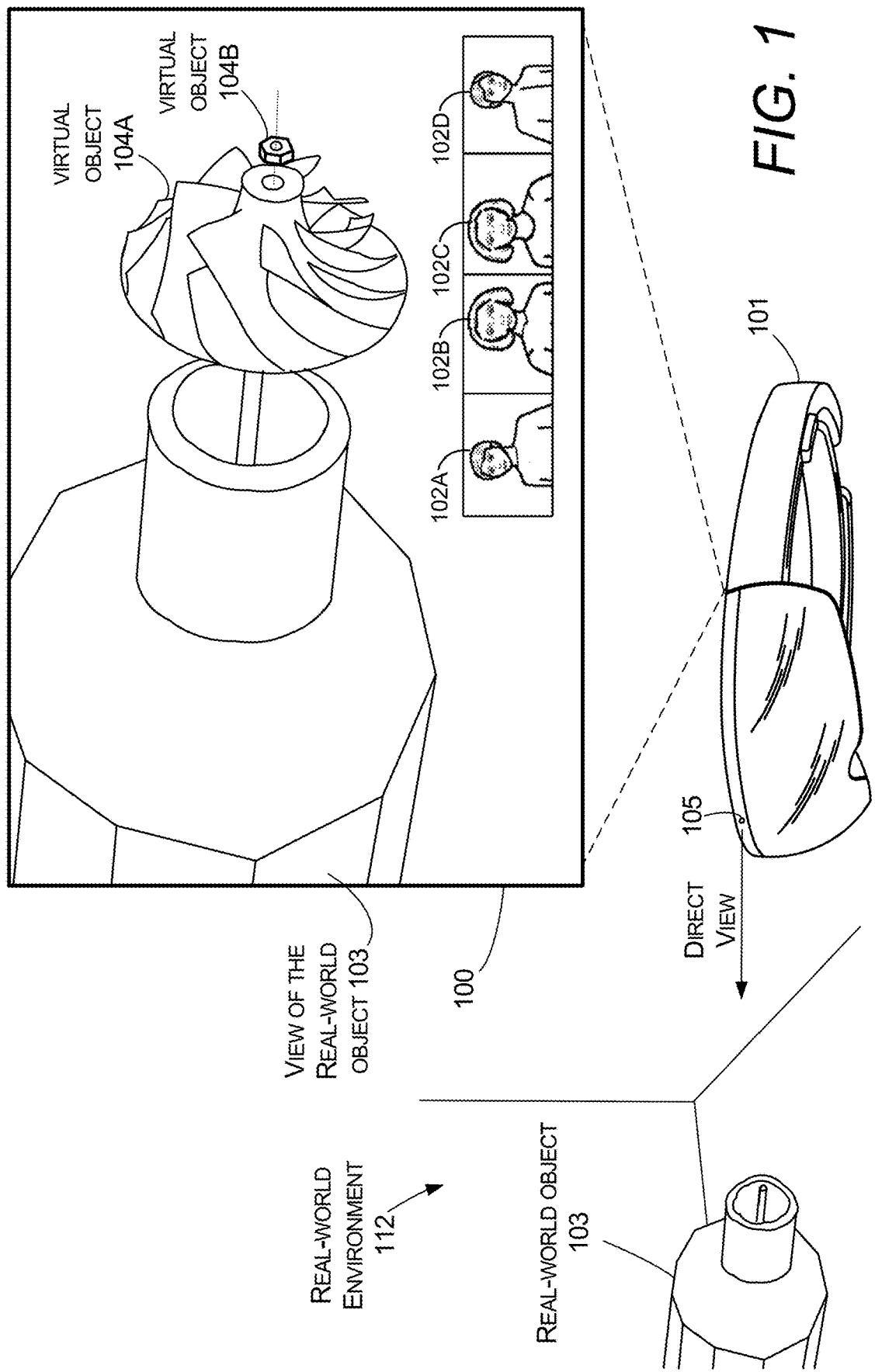
FIG. 1 illustrates a display of a collaborative environment generated by a computing device capturing an image of a real-world object.

FIG. 1 illustrates an example user interface 100 displaying aspects of a collaborative environment that may be utilized to facilitate aspects of the present disclosure. In this example, an image sensor 105, e.g., a camera, of the computing device 101 is used to capture an image of the real-world object 103 within a real-world environment 112. In this illustrative example, the real-world object 103 is an engine. The computing device 101 can share an image of the real-world object 103 with a number of individual users 102A-102D ("users 102") that are communicating within the collaborative environment. The computing device 101 can also coordinate with other computing devices to generate a shared display of virtual objects 104 that are rendered with a view of a real-world object 103.

The users 102 can create and edit the virtual objects 104 by the use of voice commands, movement gestures, or other types of interactions with a wide range of input devices. In this illustrative example, a first virtual object 104A (a fan) and a second virtual object 104B (a fastening device) are positioned at a specific location relative to the real-world object 103. The users 102 can move and resize the virtual objects 104. In addition, the users 102 can use one or more gestures, including a voice command, to associate the virtual objects 104 with one or more real-world objects. In this illustrative example, the first virtual object 104A and the second virtual object 104B are associated with the real-world object 103, the engine. The association between each object can be based on a relative position between each object, graphical elements showing an association, text descriptions, or any other suitable graphical representation. In this example, the first virtual object 104A and the second virtual object 104B are aligned with an axle of the engine to illustrate the association between the objects, e.g., how parts are to be assembled.

The users 102 can also communicate with one another within the collaborative environment using a number of different mediums including, but not limited to: shared audio, video, and text communication. In this example, a first user, 102A, a second user 102B, a third user 102C, and a fourth user 102D are all in communication with one another, and a video stream of each user 102 is rendered within the user interface 100.

The computing device 101 can identify both real-world objects and virtual objects within the collaborative environment. For illustrative purposes, general references to an "object" or "objects" refer to both virtual objects and real-world objects. The techniques disclosed herein can use any number of object recognition technologies including, but not limited to, edge detection, pattern detection, or shape detection algorithms, to identify an object. In this example, the computing device 101 recognizes that the real-world object 103 is an engine by its shape, size, and other physical characteristics. One or more real-world objects can also be identified by the use of sounds emitted by an object that are detected by a microphone. Colors, shapes, patterns, surface textures, or other characteristics can be utilized to identify model numbers, manufacturers, parts, etc. Virtual objects can also be identified by an analysis performed on model data defining each virtual object. The shape, size or other characteristics can be interpreted directly from an analysis of the model data.

In response to identifying real-world objects and virtual objects that are displayed within the collaborative environment, the computing device 101 generates individual agents in association with each individual object. Each agent 201 (shown in FIG. 2) can be an autonomous computing unit that is configured to collect and manage data associated with each object. Each agent is stored persistently, e.g., in a datastore that maintains all data associated with each agent

201 even after a communication session associated with the collaboration environment is terminated. In some embodiments, each agent can be in the form of a virtual machine that can be stored on a single computing device and communicated between different computing devices.

In some embodiments, the computing device 101 can generate an agent for specific objects of interest. The objects of interest can be selected based on physical properties of the objects or user activity. For instance, a particular object may be deemed an object of interest if the object contains moving parts, has a size that exceeds a threshold, has a predetermined shape, etc. In another example, a particular object may be deemed as an object of interest based on an analysis of user discussions or preference data. Users 102 making comments about specific objects, such as the engine, can cause the computing device 101 to select the object based on keywords or gestures associated with the object. In one specific example, the engine shown in FIG. 1 can be deemed an object of interest if user communication includes a threshold number of keywords or gestures associated with the engine. Other objects that are in direct view of the camera 105 of the computing device 101, such as the walls of a room, a light switch near the user, may not be deemed an object of interest if users have little interaction related to those objects.

In some embodiments, the computing device 101 can generate a score to determine if a particular object is an object of interest. An object may be selected as an object of interest when an associated score exceeds a threshold. A score may be generated based on a number factors. For instance, a score may be generated based on a number of times or a frequency of interactions a user has with a particular object. A score may also be based on movement of an object or other characteristics such as size, shape, etc. The score can be used to rank objects. A ranking may be utilized to select a group of objects having a predetermined size. For instance, a collaborative environment may have data defining a maximum number of objects for a particular communication session or a particular computing device. In such embodiments, the highest ranked objects, up to the maximum number of objects, can be selected as objects of interest.

Figure 2:
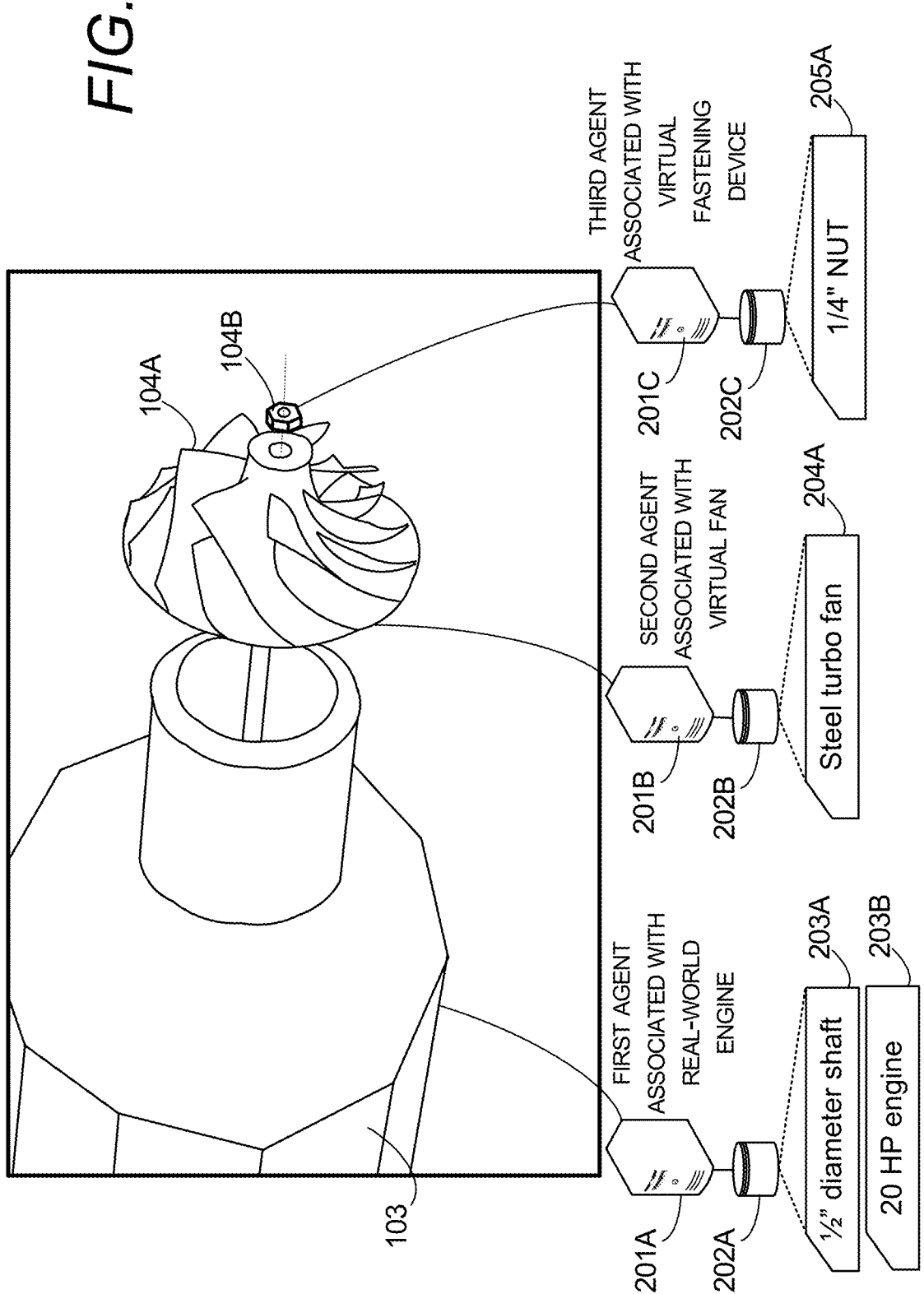
FIG. 2 is a block diagram illustrating several intelligent agents that are generated in association with virtual objects and real-world objects.

FIG. 2 illustrates an example implementation that includes a number of agents 201 that are generated in association with identified objects. In this example, a first agent 201A is generated in association with the real-world object 103, a second agent 201B is associated with the first virtual object 104A, and a third agent 201C is associated with the second virtual object 104B.

Each agent 201 manages a database 202 for storing data records (203-205) defining keywords, descriptions, parameters, or other data about individual objects. In some embodiments, each database 202 can be configured to operate autonomously, e.g., each database 202 is stored in a data structure that can be independently communicated from one computing device to another computing device without impacting other databases 202. In some embodiments, each database 202 is stored within a data structure, referred to herein as "agent data," that also defines an associated agent 201. As shown in FIG. 2, the present example includes a first database 202A in communication with the first agent 201A, a second database 202B in communication with the second agent 201B, and a third database 202C in communication with the third agent 201C.

As also shown in FIG. 2, the computing device 101 can generate and modify data records (203-205) associated with each object. The data records (203-205) may be generated based on a number of factors. In some embodiments, the data records (203-205) describing aspects of each object may be generated based on a shape, size, or other physical characteristic of a real-world object or a virtual object. For instance, in the present example, a data record 203A describing a diameter of the engine driveshaft can be generated based on an analysis of an image of the engine, where the image can be used to measure parameters of a particular component such as the driveshaft. Such data can be generated by the analysis of depth map data and image data captured by the computing device. By the use of a measurement obtained from the depth map data and image data, a computing device can determine geometries and shapes of real-world objects. Such measurements can be recorded in the data records 203.

The computing device 101 can also analyze text or other insignia to generate or modify data records (203-205) associated with each object. For example, a computing device may determine and record model numbers, product brands, or other related characteristics of an object. In the present example, a data record 203B describing the horsepower of the engine can be generated based on text inscribed on the engine or by the size or shape of the engine. These examples are provided for illustrative purposes and are not to be construed as limiting. It can be appreciated that any type of keyword, description, or parameter of an object can be generated by an analysis of a particular object.

The computing device 101 can also analyze model data defining virtual objects and it can also be utilized to generate or modify data records (203-205) describing aspects of each object. For instance, in the present example, model data defining the first virtual object 104A can be analyzed to determine that the object is made of a particular material, such as steel. One or more records, such as record 204A, can be generated by an associated agent, such as the second agent 201B, to store such information. Also shown in FIG. 2, another record 205A describing aspects, e.g., a size, of the second virtual object 104B is also generated.

Figure 3:
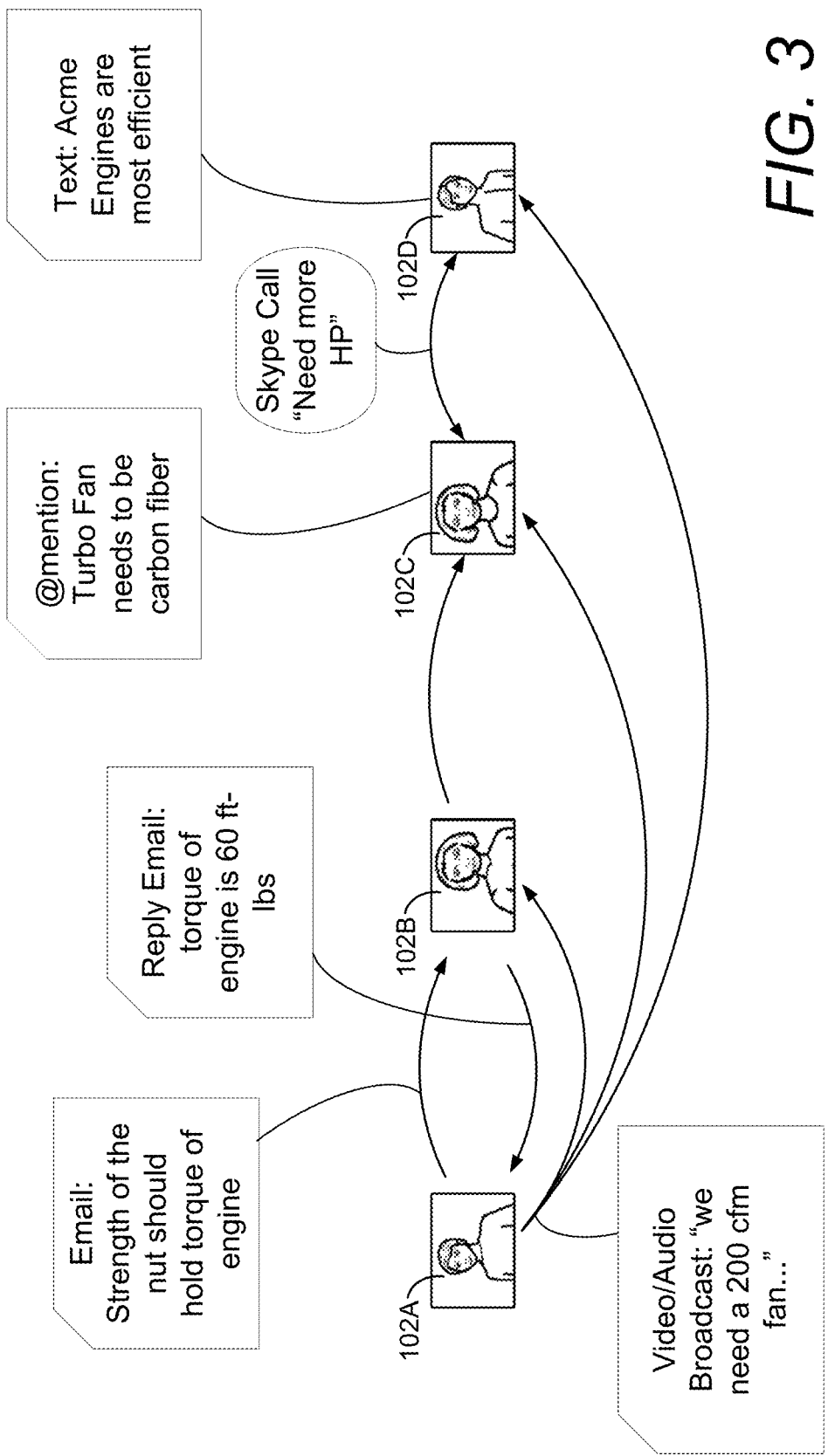
FIG. 3 illustrates a number of forms of communication that may be performed by users interacting in a collaborative environment.

The agents 201 can also monitor a number of different types of user activity during a multi-user communication session to generate or modify data records (203-205). The monitored user activity can include any type of user interaction with a computer or any type of communication, e.g., polling, edits, text chats, and voice conversations. The techniques disclosed herein can monitor any type of interaction data defining a user input from an input device, a user sharing content, a user sending or receiving streams over a communication session, or receiving content. As shown in FIG. 3, the agents 201 can monitor a variety of communication mediums including, but not limited to, emails, phone calls, @mentions, video calls, text messages, audio data of a communication session, etc. For instance, as shown in FIG. 3, each of the agents may analyze an email string sent between the first user 102A and the second user 102B to determine that the emails are related to the second virtual object 104B. Each of the other forms of communication, e.g., video broadcasts, @mention, or private calls, can also be analyzed and parsed to identify parameters, preferences, or other information related to each object.

Figure 4:
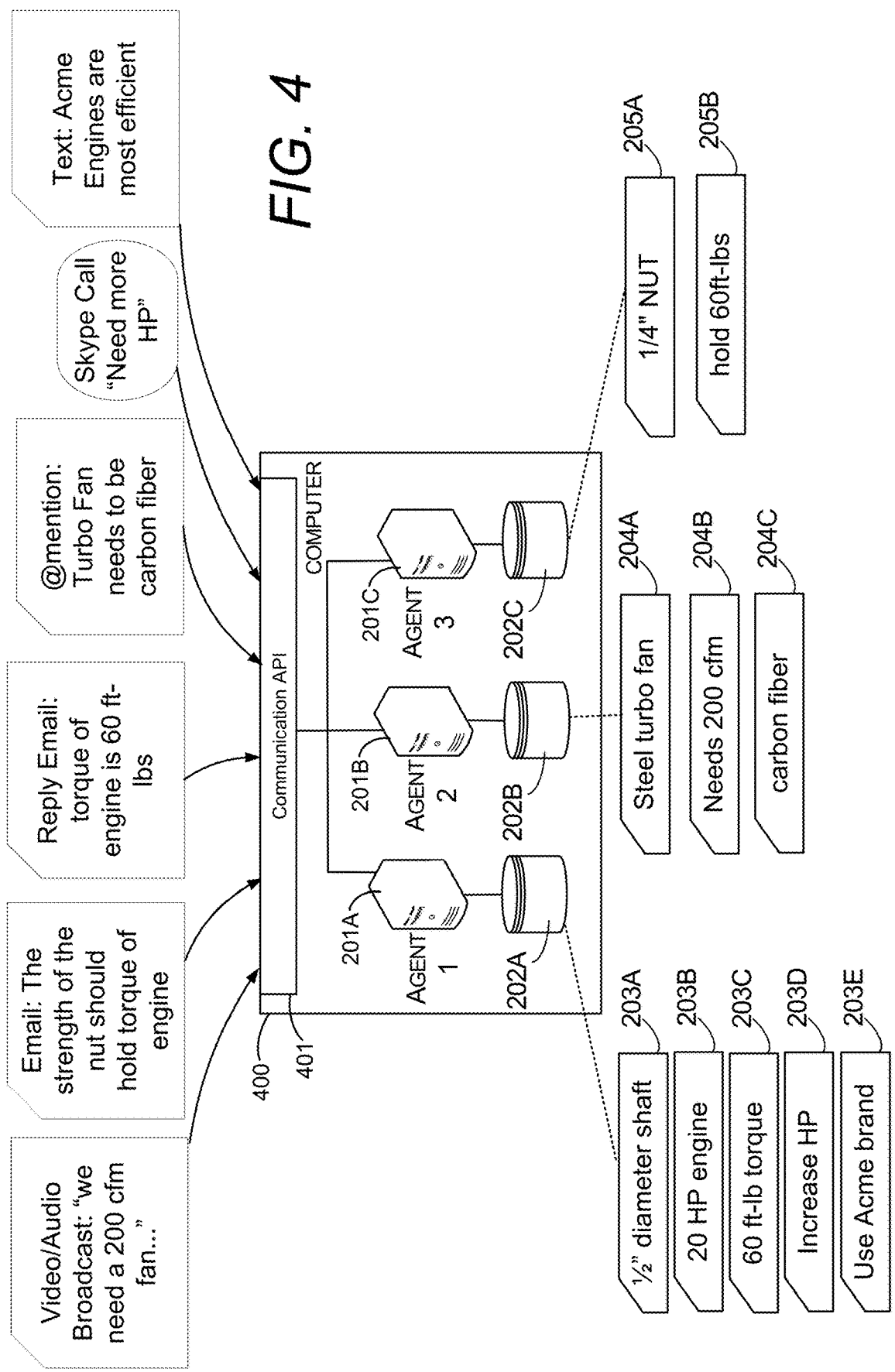
FIG. 4 is a block diagram illustrating several intelligent agents for collecting FIG of a collaborative environment by the use of an application programming interface.

The respective agents 201 can collect and store activity data defining the monitored activity in individual databases 202 associated with their respective objects. For example, as shown in FIG. 4, based on the monitored communication between the users, each agent 201 stores the collected information pertaining to each object. In some configurations, the collected information is received through an application programming interface (API) in communication with each agent 201. Each instance of communication, such as data from a phone call, an email, or an @mention, can be parsed and stored in a particular database 202. Data that is parsed from each instance of communication can be stored in a record (203-205).

The computing device 101 can associate activity data defining a particular instance of user activity with an object if the particular instance of user activity makes a reference to an object. For instance, keywords, phrases, images, audio data, or any other information that have a defined threshold level of relevancy to a particular object can cause the computing device 101 to associate a particular instance of user activity with an object. Once an association with an object has been made, the activity data defining the particular instance of user activity can be stored in an associated database.

For example, the data of the broadcast can be analyzed to determine that the fan has specification requirements, e.g., that the fan requires a performance of 200 cubic feet per minute (CFM). The analysis of such communication can be stored in a database record, such as record 204B. The email can be analyzed to determine aspects of the fastening device, e.g., that the nut needs to have a particular strength, and the reply email can be analyzed to determine parameters of the required strength, e.g., that the engine can produce a torque of 60 foot-pounds. The analysis of such communication can be stored in database records of the associated objects. For example, record 203C of the first database 202A can be generated to indicate the engine torque specification and record 205B of the third database 202C can be generated to indicate a torque requirement for the fan. Further, the @mention can be analyzed to determine aspects of the first virtual object 104A, e.g., the fan. In response, a record, such as record 204C, can be generated to indicate that the fan needs to be made of carbon fiber.

Other forms of communication can be analyzed and parsed in a similar manner and information pertaining to a particular object is stored in an associated database. In the present example, a data record 203D, based on the Skype call, indicates a need to increase the horsepower of the engine, and a data record 203E, based on the text, indicates a recommended brand-name for the engine.

Figure 5:
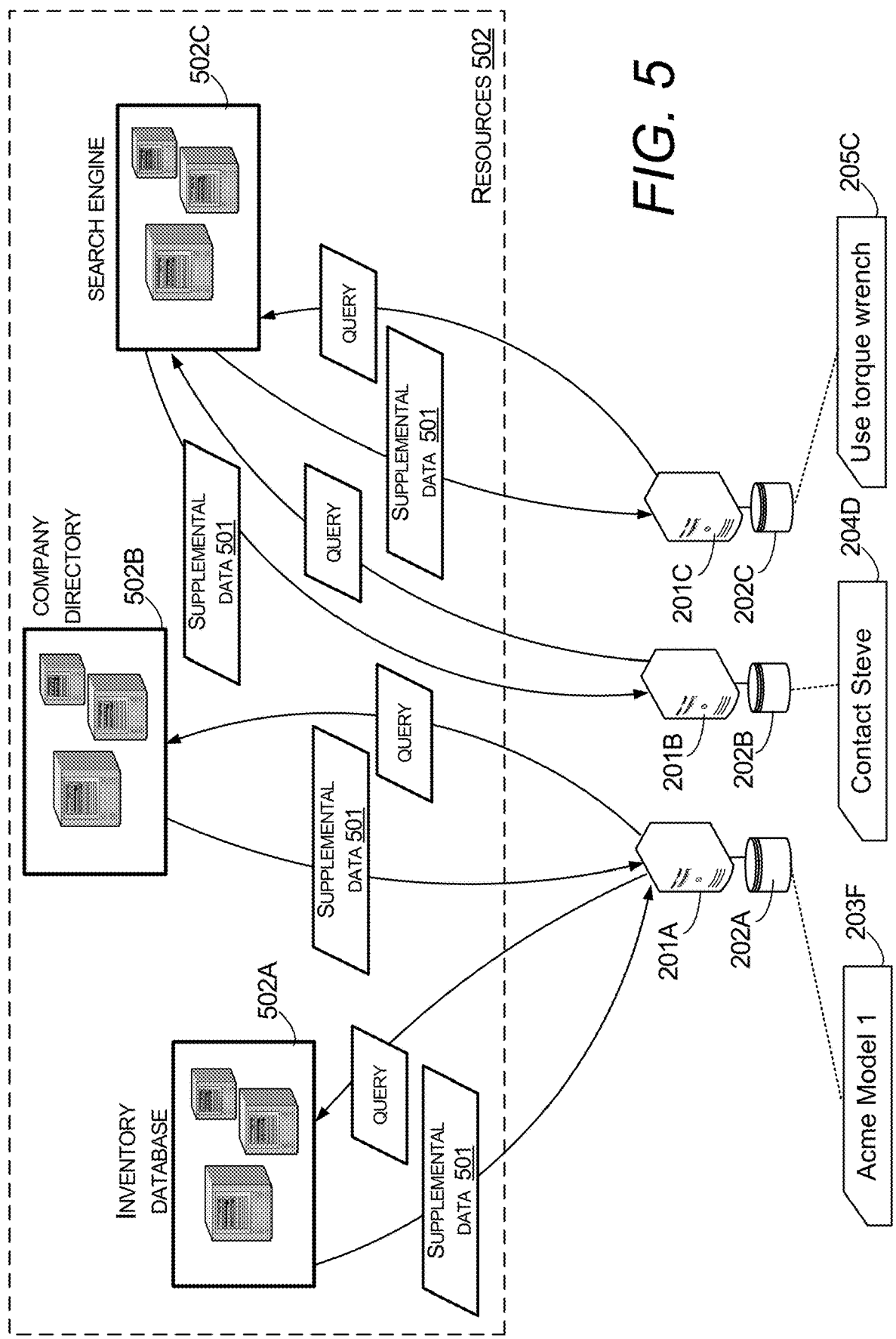
FIG. 5 is a block diagram illustrating a number of external resources that may be utilized by the intelligent agents to collect supplemental data associated with virtual objects and real-world objects.

Turning now to FIG. 5, in some configurations, each agent 201 can retrieve supplemental data 501 from external resources 502. The supplemental data 501 can include any information pertaining to the data records associated with each object. For instance, queries can be generated from existing data records (203-205), and each query can be sent to various resources 502, such as, but not limited to, an inventory database 502A, a company directory 502B, and a search engine 502C. Each resource 502 can return supplemental data 501 in response to the queries. In addition, each resource 502 can also push relevant supplemental data 501 to each agent.

In one illustrative example, the first agent 201A can generate a query based on the record stored in the first database 202A, e.g., records 203A-203E. In one illustrative example, the first agent 201A may generate a query defining parameters of the real-world object, e.g., the shaft diameter, horsepower, brand-name, etc. In response to the query, a resource, such as the inventory database 502A may return supplemental data 501 defining a new engine, e.g., Acme Model 1, that meets the performance requirements indicated in the data records 203. Such supplemental data 501 can be stored in a new data record 203F in the first database 202A.

In another illustrative example, the second agent 201B may generate a query defining aspects from the records of the first virtual object 104A, e.g., that 200 CFM fan is required and that the model data indicates a steel construction. In response to the query, a resource, such as the company directory 502B, can return supplemental data 501 identifying individuals having expertise with such objects. Such supplemental data 501 can be stored in a new data record 204D in the second database 202B.

In yet another illustrative example, the third agent 201C may generate a query based from the records associated with the second virtual object 104B, e.g., that the fastening device as a particular size and requires a particular strength. In response to the query, resource, such as the search engine 502C, can return supplemental data 501 that includes a recommendation to use a torque wrench. Such supplemental data 501 can be stored in a new data record 205C in the third database 202C. It can be appreciated that the supplemental data 501 can include data of any format, including three-dimensional model data, performance statistics, images, audio data, etc.

Figure 6:
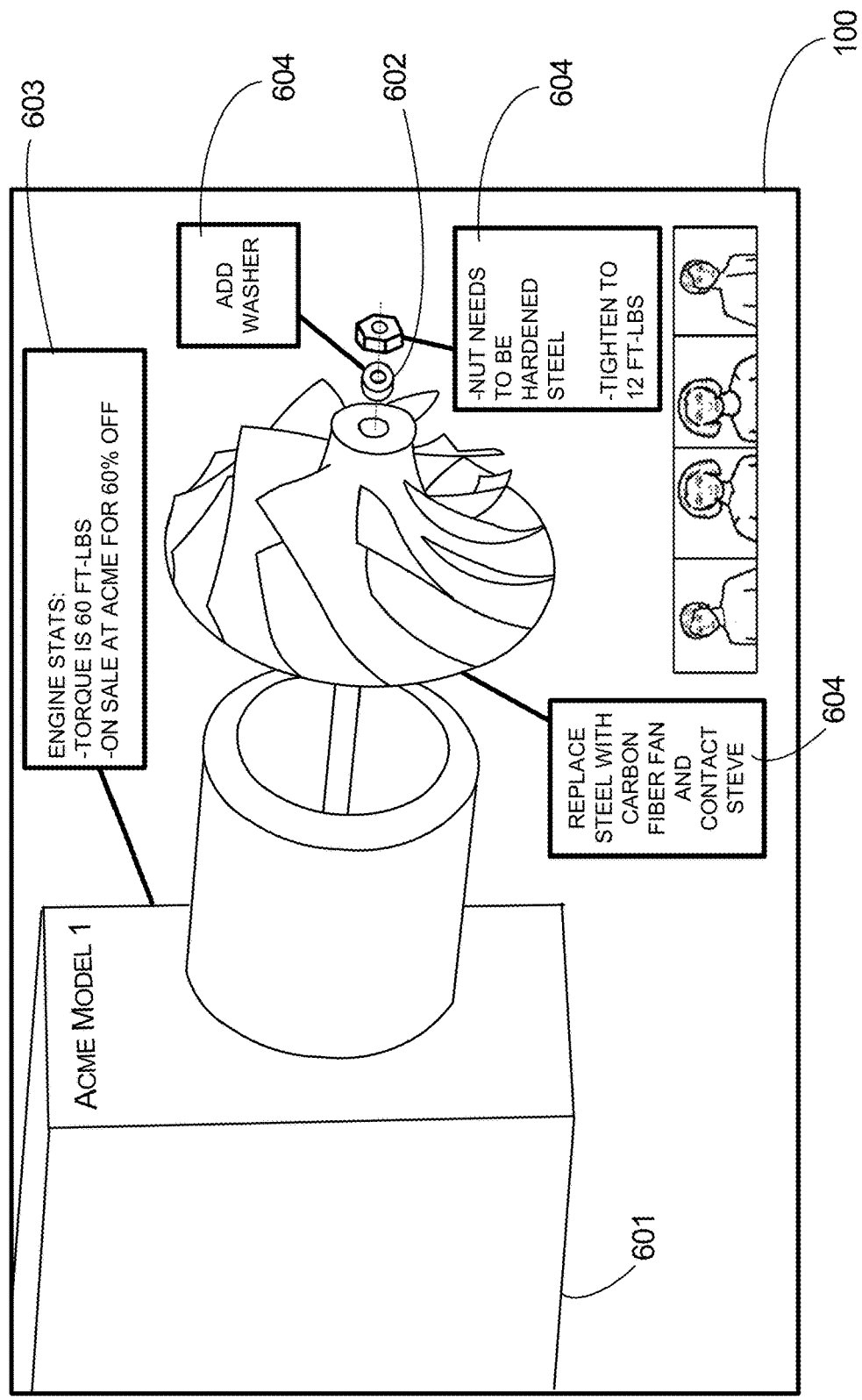
FIG. 6 illustrates a display of a collaborative environment showing a number of recommendations associated with virtual objects and real-world objects generated by the intelligent agents.

As shown in FIG. 6, the computing device 101 can generate recommendations for individual objects based on the stored information. The recommendations can suggest modifications to the objects, provide resources for obtaining or modifying the objects, and provide actionable information allowing users to reach a consensus regarding an object. The recommendations can be in the form of (1) a modification of an extant virtual object, (2) a new virtual object positioned over a real-world object, or (3) an annotation recommending a modification to a real-world object. Data defining the recommendations associated with each object can also be stored persistently within a data record (203-205).

FIG. 6 illustrates a number of example recommendations. For instance, a recommendation can be in the form of a new virtual object 601 that is displayed as a virtual partial overlay over the image of the real-world object. In this example, the new virtual object 601 is in the form of another engine, e.g., Acme Model 1, that meets the performance requirements indicated in the data records 203. Such a recommendation may be automatically rendered as a three-dimensional or two-dimensional virtual object that is provided as an overlay over real-world objects or other virtual objects. By providing an overlay over real-world objects, users can readily visualize a proposal without requiring users to manually manipulate content.

The recommendations can also include computer-generated modifications of a design based on the agent analysis of the communication data and the supplemental data. As shown in FIG. 6, a new virtual component 602, e.g., a washer, can be added to a schematic layout. The position and size of the new virtual component 602 can be based on information provided in the supplemental data 501.

The agent recommendations (also referred to herein as "recommendations") can also include graphical elements providing other contextual information 603 or instructions 604 related to an object. As shown in FIG. 6, the graphical elements can be displayed in association with a particular object. The contextual information 603 or the instruction 604 can be generated from the supplemental data 501 or any other data record associated with an object. In the examples shown in FIG. 6, some recommendations indicate that a steel fan should be replaced with a carbon fiber fan, and identify vendors, etc.

The computing device 101 can prioritize and rank various recommendations based on the contents of the data records. In some configurations, the computing device 101 may store data defining a maximum number of recommendations that can be displayed. The computing device 101 may display any number of recommendations up to a maximum number of recommendations. In some embodiments, the display of recommendations may be arranged according to a defined priority of each recommendation, e.g., the recommendations may be ordered from a highest priority to lowest priority. Thus, the recommendations may also be prioritized based on any type of contextual information. For instance, the recommendations may be prioritized and ranked based on votes or preferences of each user. In other examples, a priority for each recommendation may be based on a number of comments made by various users regarding a particular object, a number of interactions referencing a recommendation, or a combination of other types of user activity, such as a number of times a user looks at a particular object or recommendation.

Users can interact with the agent recommendations by selecting or otherwise interacting with the displayed recommendations. A user can select a particular recommendation by providing a voice gesture or a touch gesture. In some configurations, a user interaction with a particular recommendation can be interpreted as a vote or a preference for a particular recommendation. Communication data can also be monitored to identify a vote or preference for a particular recommendation. Supporting comments or votes can be tallied and when a particular defined threshold of comments or votes is reached, the computing device 101 can determine a consensus for a particular group of users.

The computing device 101 can take a number of different actions when a consensus is reached. For instance, when a threshold number of votes is received for a particular recommendation, the modification may be permanently written to a database 202 associated with the particular object. In another example, when a threshold number of votes is received for a particular recommendation, the computing device 101 may generate a subsequent query based on the recommendation for additional supplemental information, which may in turn cause a generation of additional recommendations.

As summarized above, the intelligent agents 201 can persist through different communication sessions to enhance user engagement and improve productivity. For example, if a first group of users is conducting a Skype meeting about a car engine design, an intelligent agent can be instantiated for each part of the engine. The intelligent agent can monitor all types of user activity during a multi-user communication session, e.g., polling, edits, text chats, and voice conversations. Data derived from the monitored activity can be displayed and stored in association with each object, e.g., each engine part. The agents and the associated databases are configured such that, when the Skype meeting ends, the agents and the stored data persist beyond the communication session. Thus, the agents allow users to access the agents and the stored data when new communication channels, e.g., private chat sessions or new meetings, are created.

Figure 7:
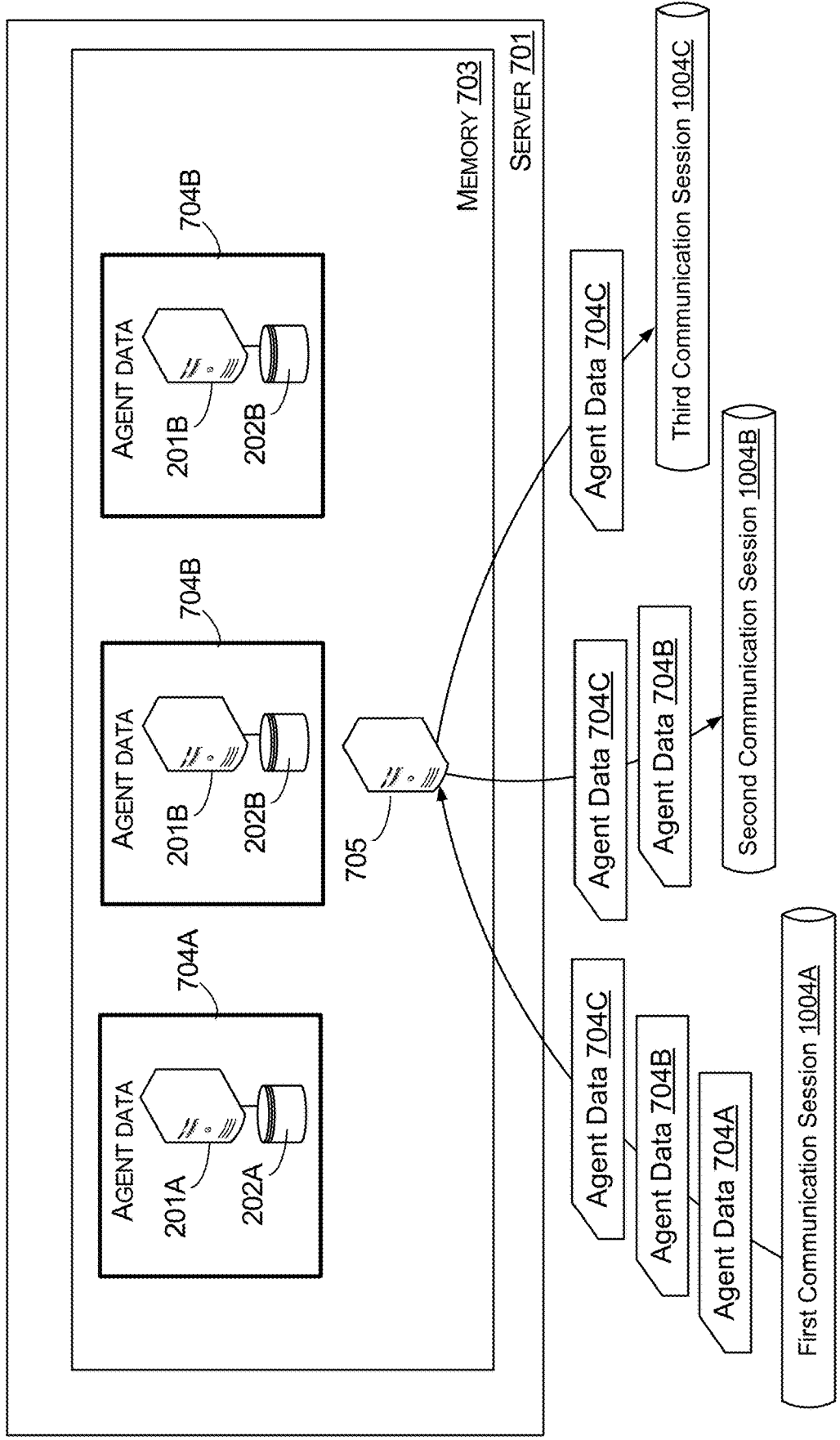
FIG. 7 illustrates a block diagram of a system having a management agent for managing agent data between communication sessions.

Referring now to FIG. 7, aspects of a computing device that enables persistent storage of the agents and stored data is shown and described below. In this illustrative example, a server 701 comprises memory 703 storing agent data 704 that defines aspects of an individual agent 201 and an associated database 202. In continuing the example described above, FIG. 7 shows a first agent data 704A that defines the first agent 201A and the first database 202A, a second agent data 704B that defines a second agent 201B and the second database 202B, and a third agent data 704C that defines a third agent 201C and a third database 202C.

In this example, a management agent 705 can receive agent data 704 from any communication session such as a Skype meeting, a broadcast, or a chat session, and the stored agent data 704 and memory 703. The memory 703 can be configured to maintain the agent data 704 independent of the lifecycle of each communication session 1004. Thus, the management agent 705 can deliver the agent data 704 to other communication sessions.

In the example shown in FIG. 7, a first communication session 1004A, such as the collaboration environment illustrated in FIG. 1, can generate agent data 704 defining individual agents 201 and associated databases 202. During the communication session, or at the conclusion of the communication session, agent data 704 can be communicated to the server 701 executing the management agent 705. The management agent 705 can store the agent data persistently in memory 703, which can be in the form of a database, persistent memory, or any other memory device that allows the agent data to persist independent of the execution and termination of any communication session.

Next, as other communication sessions are created, such as the second communication session 1004B and the third communication session 1004C, the management agent 705 may provide relevant agent data 704 for each session. Agent data 704 defining a particular agent 201, may be selected based on one or more factors. For instance, if a new communication session includes content that has keywords describing a particular object, agent data 704 that is related to that object may be delivered to a computing device managing the communication session. In this example, second agent data 704B and third agent data 704C are delivered to the second communication session 1004B, and the third agent data 704C is delivered to the third communication session 1004C.

Figure 8:
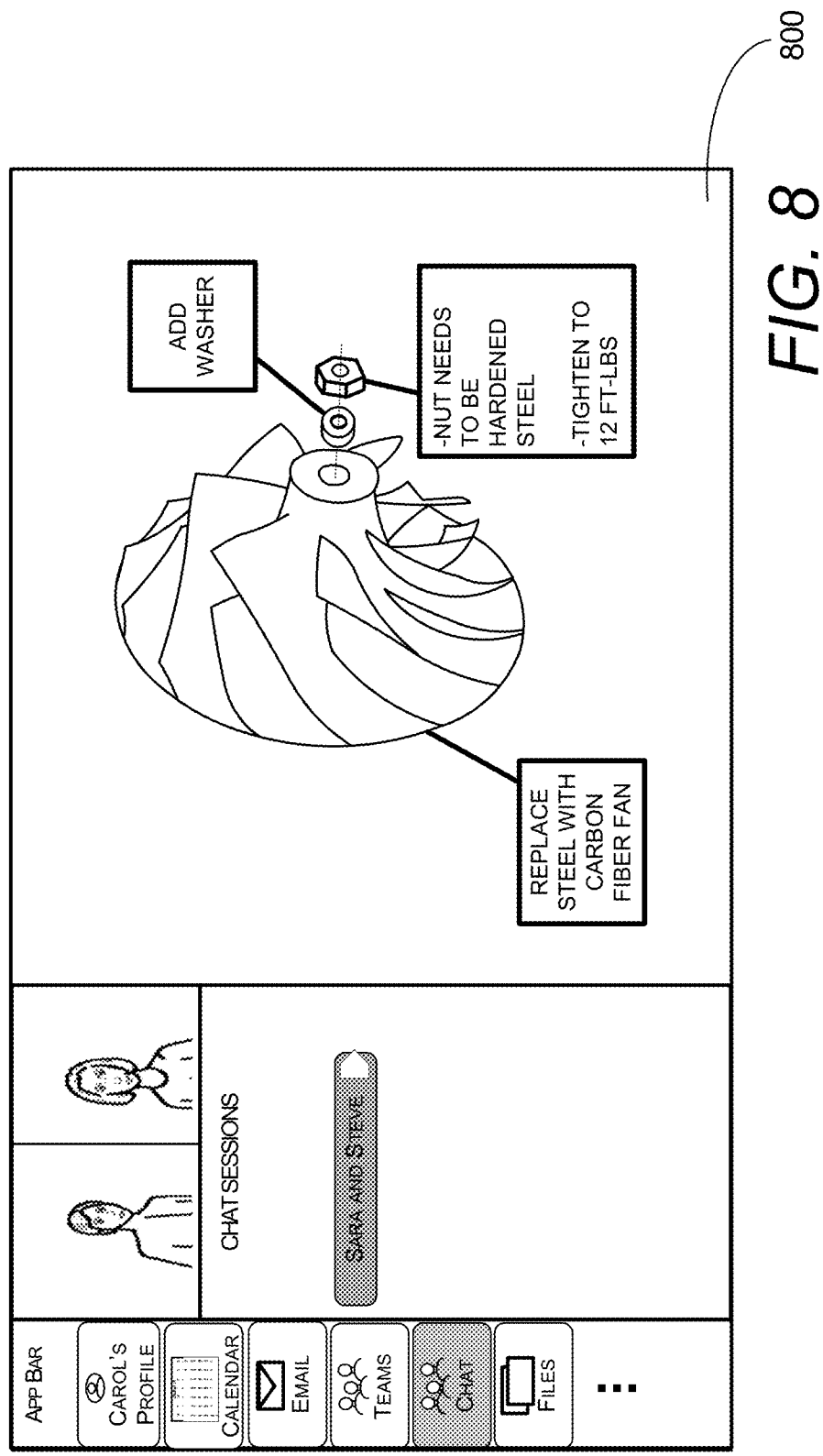
FIG. 8 illustrates a display of a subsequent collaborative environment involving a private chat that utilizes the intelligent agents created in the first collaborative environment.

Referring now to FIG. 8, an example user interface 800 for the second communication session 1004B is shown and described below. In this example, the second communication session 1004B is in the form of a private chat session between two individuals, Sarah and Steve. In this example, it is a given that their conversation included a discussion on the fan and the fastening device. In response to the agent detecting the context of the conversation, the objects defined in the relevant agent data 704 are displayed in the user interface 800 of their communication session. This feature eliminates the need for users to gather information and interact with computers to display that gathered information within the session.

It can be appreciated that the second communication session 1004B can be processed as described above. Thus, the user activity of the private chat session can be utilized to obtain additional supplemental data as well as cause the generation of additional data records for each object. Also, additional recommendations may be generated and stored within new data records associated with each object. As the users produce new virtual objects or view new real-world objects, additional agents 201 and associated databases 202 can be generated.

Figure 9:
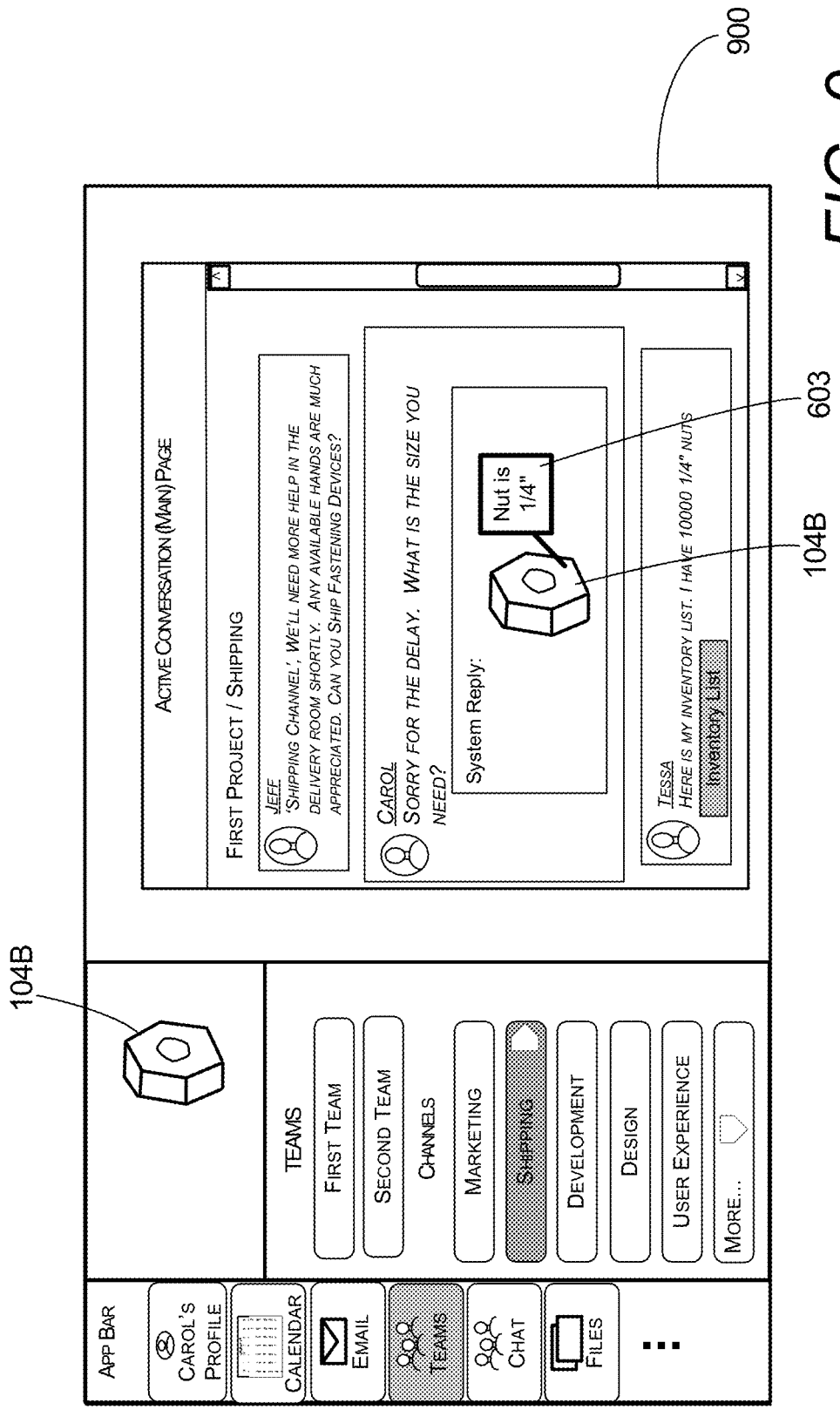
FIG. 9 illustrates a display of a subsequent collaborative environment involving a Teams Session that utilizes the intelligent agents created in the first collaborative environment.

Referring now to FIG. 9, an example user interface 900 for the third communication session 1004C is shown and described below. In this example, the third communication session 1004C is in the form of a Teams Session between a large number of participants. In a Teams Session, multiple users are in communication via a chat window along with a shared video session 902. In this example, the participants start to chat about a particular object, the fastening device. In response to detecting keywords or other information related to an object defined in at least one database 202, such as the fastening device, a computing device managing the third communication session 1004C can retrieve the agent data 704C associated with the object. Based on the contents of the agent data 704C, the computer managing the third medication session 1004C can render the relevant object and other information stored in the associated data records. As shown in FIG. 9, the second virtual object 104B is rendered within the user interface 900 along with other information, such as the related contextual information 603. Such information can be automatically retrieved and automatically rendered by the agent based on the context of the conversation. The second virtual object 104B and the related contextual information 603 can be retrieved and displayed in response to a conversation object referencing, e.g., asking about or mentioning, the virtual object.

The retrieval and display of contextually relevant information that is displayed in a usable format can improve the interaction between the users and a computing device by reducing the need for manual operations that will be needed to carry out those operations. This feature can reduce inadvertent inputs and improve productivity for individuals while also reducing the use of computing resources required to carry out those manual operations.

It can be appreciated that the second communication session 1004B can also be processed as described above. Thus, the user activity of the private chat session can be utilized to obtain additional supplemental data as well as cause the generation of additional data records for each object. In addition, additional recommendations may be generated and stored within new data records associated with each object. As the users produce new virtual objects or view new real-world objects, additional agents 201 and associated databases 202 can be generated.

In some configurations, machine learning techniques may be utilized to examine the data records to generate recommendations. The term "machine learning" may refer to one or more programs that learn from the data it receives and analyzes. For example, a machine learning mechanism may build, modify or otherwise utilize a model that is created from example inputs and makes predictions or decisions using the model. The machine learning mechanism may be used to improve the identification or generation of a recommendation based on requirements of an object or user preferences. The model may be trained using supervised and/or unsupervised learning. For instance, over time as the machine learning mechanism receives more data, the recommendations displayed within a collaborative environment may change over time based on data defining user activity.

Different machine learning mechanisms may be utilized. For example, a classification mechanism may be utilized to determine an agent recommendation based on requirements associated with an object and the availability of other objects or information that meet those requirements. In another example, different classifications can indicate whether users prefer or do not prefer a particular object or agent recommendation. The classification mechanism may classify the display elements into different categories that provide an indication of whether the display element should be displayed.

In other examples, a statistical mechanism may be utilized to determine whether a particular agent recommendation should be displayed or whether a particular object is to be selected as an object of interest. For example, a linear regression mechanism may be used to generate a score that indicates a likelihood that an object is an object of interest. Linear regression may refer to a process for modeling the relationship between one variable with one or more other variables. Different linear regression models might be used to calculate the score. For example, a least squares approach might be utilized, a maximum-likelihood estimation might be utilized, or another approach might be utilized.

Figure 10:
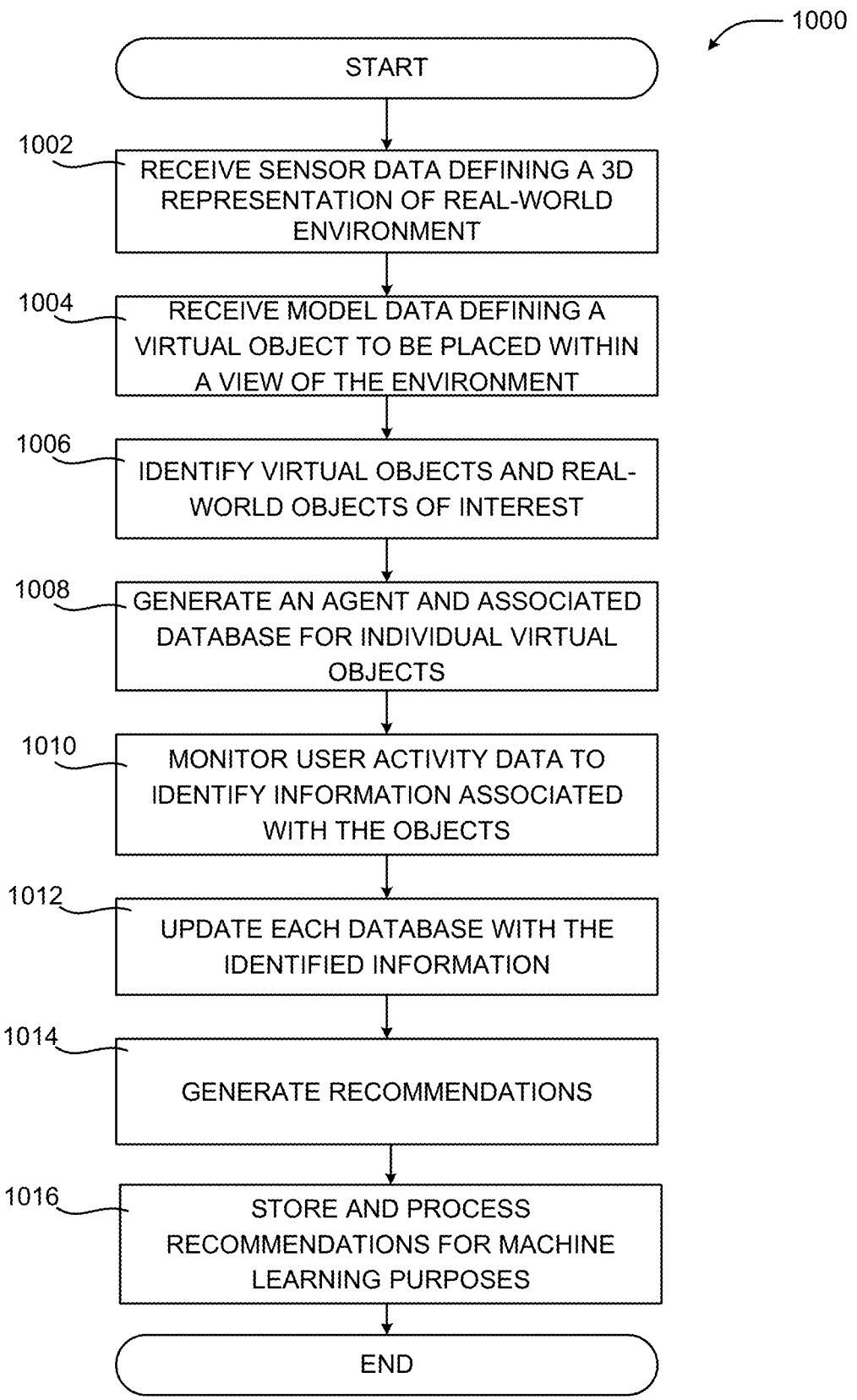
FIG. 10 is a flow diagram illustrating aspects of a routine for computationally efficient intelligent agents for managing data associated with objects that are displayed within mixed-reality and virtual-reality collaborative environments.

FIG. 10 is a diagram illustrating aspects of a routine 1000 for computationally efficient management of data associated with objects that are displayed within mixed-reality and virtual-reality collaboration environments. It should be understood by those of ordinary skill in the art that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, performed together, and/or performed simultaneously, without departing from the scope of the appended claims.

It should also be understood that the illustrated methods can end at any time and need not be performed in their entireties. Some or all operations of the methods, and/or substantially equivalent operations, can be performed by execution of computer-readable instructions included on a computer-storage media, as defined herein. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system such as those described herein) and/or (2) as interconnected machine logic circuits or circuit modules within the computing system. The implementation is a matter of choice dependent on the performance and other requirements of the computing system. Accordingly, the logical operations may be implemented in software, in firmware, in special purpose digital logic, and any combination thereof.

Additionally, the operations illustrated in FIG. 10 and the other FIGURES can be implemented in association with the example presentation UIs described above. For instance, the various device(s) and/or module(s) described herein can generate, transmit, receive, and/or display data associated with content of a communication session (e.g., live content, broadcasted event, recorded content, etc.) and/or a presentation UI that includes renderings of one or more participants of remote computing devices, avatars, channels, chat sessions, video streams, images, virtual objects, and/or applications associated with a communication session.

The routine 1000 begins at operation 1002, where the computing device 101 receives sensor data that defines a 3D representation of a real-world environment. The sensor data can be captured by a depth map sensor, e.g., a depth map camera. In addition, the sensor data can be captured by an image sensor, e.g. a camera, where the depth map sensor and the image sensor can be part of the same component or in separate components. The sensor data comprises depth map data defining a three-dimensional model of a real-world environment and an image of the real-world environment. For instance, a real-world environment may include the walls of a room and a particular object within the room, such as the real-world object shown in FIG. 1. The sensor data can define physical properties of an object or a plurality of real-world objects within the real-world environment. The sensor data also indicates a geographic position of one or more objects within an environment. Thus, measurements of an object or measurements of the environment can be made by an analysis of the sensor data. One or more objects defined in the sensor data are shared with the number of users participating in a collaborative environment. The collaborative environment can include a communication session that allows users to send, receive and view aspects of the sensor data rendered on a display device.

The routine then proceeds to operation 1004, where the computing device 101 receives model data defining one or more virtual objects to be displayed within a view of the collaborative environment. The model data can define specific positions where the virtual objects are to be placed within a user interface of the collaborative environment.

At operation 1006, the computing device can identify virtual objects and real-world objects of interest. As described herein, objects can be deemed as objects of interest based on a number of factors, including but not limited to, a threshold level of user interaction with a particular object, a threshold level of communication regarding a particular object, a threshold level of movement of a particular object, etc.

In some embodiments, an object may be deemed as an object of interest by determining a level of interaction of input signals received from input devices with respect to at least one real-world object of the plurality of real-world objects. This may include a number of inputs for editing a particular object, a number of comments made about a particular object, the person's attention being drawn to a particular item, such as an amount of time someone spends looking at a particular item, etc. This can be determined by tracking eye movement of a particular user and noting how much time a person spends looking at an object over a period of time. A system can determine when a level of interaction exceeds a defined threshold. In response to determining that the level of interaction exceeds the threshold, a system can determine that at least one object is an object of interest. Such techniques can also apply to aspects of an object, such as the size of an object, the amount of movement of an object, a color of an object, a temperature of an object, a texture of an object, etc. A level of movement can mean a velocity, a distance, a rotational speed, or any other type of movement. When the movement exceeds a threshold, a system can deem a particular object to be an object of interest.

A system can deem a particular object as an object of interest in response to detecting a threshold level of change with respect to at least one of a temperature, a color, or a physical property of that particular object. The physical property changes can be, for instance, a shape, e.g., that an object is melting, from a liquid to a solid, from a solid to a liquid, etc.

A system can deem a particular object as an object of interest in response to determining that a physical property of the particular object matches one or more predetermined properties. For instance, a system may have a preference file indicating predetermined properties, such as a visual profile of an object, such as an engine or a computer. If the image data or the depth map data indicate that a particular real-world object has physical properties, e.g., a dimension, color, or size, that match, at least within a threshold difference, physical properties described in a preference file, that particular real-world object may be selected as an object of interest. This feature may allow a system to select, for instance, all the computers in a room, or all the engines in a view. This can eliminate unwanted objects from being identified such as walls, furniture, or people. This technique also can allow a computing device to be more efficient by only creating agents and databases for particular objects in a meeting. Thus, agents will only be generated for items that are considered to be salient in a meeting.

Next, at operation 1008, the computing device can generate one or more agents and associated databases associated with the virtual objects of interest. For illustrative purposes, the generation of an agent is referred to herein as the generation of data defining an agent instance, wherein an agent instance is associated with at least one object. Data defining the agent instance is stored persistently for access by multiple communication sessions. As described herein, individual agents are instantiated for identified objects. The individual agents are configured to analyze aspects of the object to generate descriptions, keywords, or other information regarding the object.

At operation 1010, the computing device monitors user activity to identify information associated with each object. Keyword descriptions or other parameters associated with an object are collected from various sources such as input devices, search engines, inventory databases, committee directories, etc.

At operation 1012, the computing device can update individual databases with the identified information. As described herein, any information collected in association with an object can be stored by an agent and stored within a database associated with the object.

At operation 1014, the computing device can generate one or more recommendations associated with individual objects. The recommendations can include a recommendation for modifying an object. The recommendations can be in the form of (1) a modification of an extant virtual object, (2) a new virtual object positioned over a real-world object, or (3) an annotation recommending a modification to a real-world object. The recommendations can also include the display of statistical data, performance parameters, requirements, and other contextual data.

Data defining the recommendations associated with each object can also be stored persistently across communication sessions. Thus, when an object, such as an engine part, is moved or deleted during a session, the recommendation is modified in other communication sessions to indicate such changes. For instance, if the first communication session described above is concurrently running with the second communication session, modifications to a particular object within the first communication session will update the record data and in turn, update a display of the particular object or recommendation of the object within the second communication session.

In some configurations, operation 1014 can include generating a virtual display of one or more recommendations associated with a rendering of the individual virtual objects and a view of at least one real-world object. The recommendations can be in at least one of the following formats as follows. In one example, a recommendation can include modifications to at least one virtual object comprising at least one new parameter. For example, a recommendation may actually modify the second virtual object, such as the fastening device, to have a different size, a different color, a different shape, a different texture, etc. In another example, the recommendation can include a new virtual object positioned over a real-world object. This is illustrated in the above-described example where a virtual model of a new engine is displayed over the real-world engine. In yet another example, a recommendation can include an annotation recommending a modification to at least one real-world object or a virtual object. As shown in the example of FIG. 6, a number of annotations can provide any information for an associated object, such as a new size, a new color, a different shape, or any other type of modification. In addition, an annotation can provide vendor names, contact names, or any other contextual data that may be useful for obtaining a particular item. Other information such as voting results, consensus decisions or any other decision-making data may be displayed in association with a particular object.

At operation 1016, the computing device can store and process the recommendations for machine learning purposes. As described herein, any collected information such as the communication data or the supplemental data, or any generated information such as a recommendation can be provided as input to a machine learning algorithm to improve the generation of future recommendations.

It should be appreciated that the above-described subject matter may be implemented as a computer-controlled apparatus, a computer process, a computing system, or as an article of manufacture such as a computer-readable storage medium. The operations of the example methods are illustrated in individual blocks and summarized with reference to those blocks. The methods are illustrated as logical flows of blocks, each block of which can represent one or more operations that can be implemented in hardware, software, or a combination thereof. In the context of software, the operations represent computer-executable instructions stored on one or more computer-readable media that, when executed by one or more processors, enable the one or more processors to perform the recited operations.

Generally, computer-executable instructions include routines, programs, objects, modules, components, data structures, and the like that perform particular functions or implement particular abstract data types. The order in which the operations are described is not intended to be construed as a limitation, and any number of the described operations can be executed in any order, combined in any order, subdivided into multiple sub-operations, and/or executed in parallel to implement the described processes. The described processes can be performed by resources associated with one or more device(s) such as one or more internal or external CPUs or GPUs, and/or one or more pieces of hardware logic such as field-programmable gate arrays ("FPGAs"), digital signal processors ("DSPs"), or other types of accelerators.

All of the methods and processes described above may be embodied in, and fully automated via, software code modules executed by one or more general purpose computers or processors. The code modules may be stored in any type of computer-readable storage medium or other computer storage device, such as those described below. Some or all of the methods may alternatively be embodied in specialized computer hardware, such as that described below.

Any routine descriptions, elements or blocks in the flow diagrams described herein and/or depicted in the attached figures should be understood as potentially representing modules, segments, or portions of code that include one or more executable instructions for implementing specific logical functions or elements in the routine. Alternate implementations are included within the scope of the examples described herein in which elements or functions may be deleted, or executed out of order from that shown or discussed, including substantially synchronously or in reverse order, depending on the functionality involved as would be understood by those skilled in the art.

Figure 11:
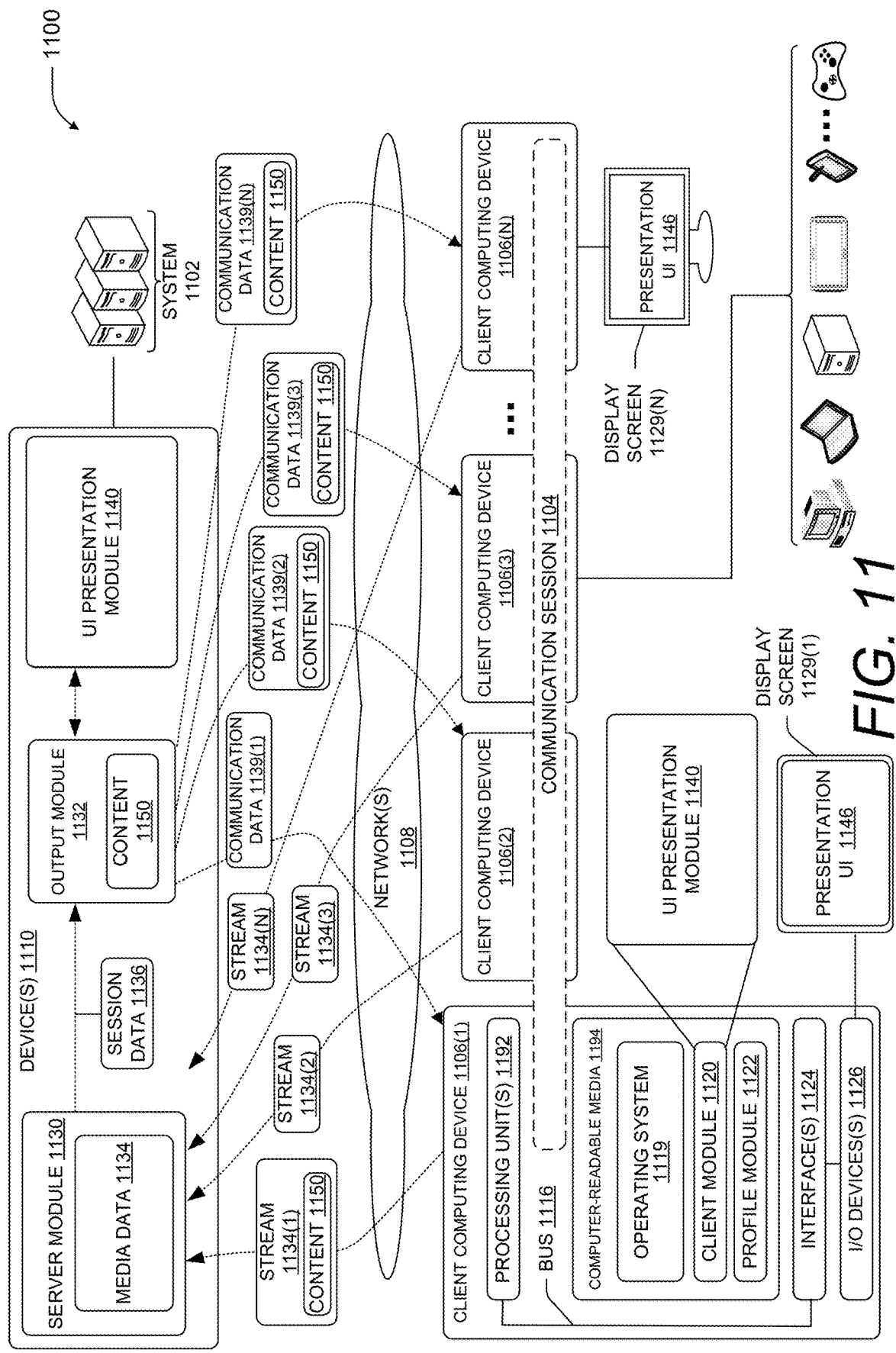
FIG. 11 is a computing system diagram showing aspects of an illustrative operating environment for the technologies disclosed herein.

FIG. 11 is a diagram illustrating an example environment 1100 in which a system 1102 can implement the techniques disclosed herein. In some implementations, a system 1102 may function to collect, analyze, share data defining one or more objects that are displayed to users of a communication session 1004.

As illustrated, the communication session 1104 may be implemented between a number of client computing devices 1106(1) through 1106(N) (where N is a number having a value of two or greater) that are associated with the system 1102 or are part of the system 1102. The client computing devices 1106(1) through 1106(N) enable users, also referred to as individuals, to participate in the communication session 1104. For instance, the first client computing device 1106(1) may be the computing device 101 of FIG. 1 or the computing device 1300 of FIG. 13.

In this example, the communication session 1104 is hosted, over one or more network(s) 1108, by the system 1102. That is, the system 1102 can provide a service that enables users of the client computing devices 1106(1) through 1106(N) to participate in the communication session 1104 (e.g., via a live viewing and/or a recorded viewing). Consequently, a "participant" to the communication session 1104 can comprise a user and/or a client computing device (e.g., multiple users may be in a room participating in a communication session via the use of a single client computing device), each of which can communicate with other participants. As an alternative, the communication session 1104 can be hosted by one of the client computing devices 1106(1) through 1106(N) utilizing peer-to-peer technologies. The system 1102 can also host chat conversations and other team collaboration functionality (e.g., as part of an application suite).

In some implementations, such chat conversations and other team collaboration functionality are considered external communication sessions distinct from the communication session 1104. A computerized agent to collect participant data in the communication session 1104 may be able to link to such external communication sessions. Therefore, the computerized agent may receive information, such as date, time, session particulars, and the like, that enables connectivity to such external communication sessions. In one example, a chat conversation can be conducted in accordance with the communication session 1104. Additionally, the system 1102 may host the communication session 1104, which includes at least a plurality of participants co-located at a meeting location, such as a meeting room or auditorium, or located in disparate locations.

In examples described herein, client computing devices 1106(1) through 1106(N) participating in the communication session 1104 are configured to receive and render for display, on a user interface of a display screen, communication data. The communication data can comprise a collection of various instances, or streams, of live content and/or recorded content. The collection of various instances, or streams, of live content and/or recorded content may be provided by one or more cameras, such as video cameras. For example, an individual stream of live or recorded content can comprise media data associated with a video feed provided by a video camera (e.g., audio and visual data that capture the appearance and speech of a user participating in the communication session). In some implementations, the video feeds may comprise such audio and visual data, one or more still images, and/or one or more avatars. The one or more still images may also comprise one or more avatars.

Another example of an individual stream of live or recorded content can comprise media data that includes an avatar of a user participating in the communication session along with audio data that captures the speech of the user. Yet another example of an individual stream of live or recorded content can comprise media data that includes a file displayed on a display screen along with audio data that captures the speech of a user. Accordingly, the various streams of live or recorded content within the communication data enable a remote meeting to be facilitated between a group of people and the sharing of content within the group of people. In some implementations, the various streams of live or recorded content within the communication data may originate from a plurality of co-located video cameras, positioned in a space, such as a room, to record or stream live a presentation that includes one or more individuals presenting and one or more individuals consuming presented content.

A participant or attendee can view content of the communication session 1104 live as activity occurs, or alternatively, via a recording at a later time after the activity occurs. In examples described herein, client computing devices 1106(1) through 1106(N) participating in the communication session 1104 are configured to receive and render for display, on a user interface of a display screen, communication data. The communication data can comprise a collection of various instances, or streams, of live and/or recorded content. For example, an individual stream of content can comprise media data associated with a video feed (e.g., audio and visual data that capture the appearance and speech of a user participating in the communication session). Another example of an individual stream of content can comprise media data that includes an avatar of a user participating in the conference session along with audio data that captures the speech of the user. Yet another example of an individual stream of content can comprise media data that includes a content item displayed on a display screen and/or audio data that captures the speech of a user. Accordingly, the various streams of content within the communication data enable a meeting or a broadcast presentation to be facilitated amongst a group of people dispersed across remote locations.

A participant or attendee to a communication session is a person that is in range of a camera, or other image and/or audio capture device such that actions and/or sounds of the person which are produced while the person is viewing and/or listening to the content being shared via the communication session can be captured (e.g., recorded). For instance, a participant may be sitting in a crowd viewing the shared content live at a broadcast location where a stage presentation occurs. Or a participant may be sitting in an office conference room viewing the shared content of a communication session with other colleagues via a display screen. Even further, a participant may be sitting or standing in front of a personal device (e.g., tablet, smartphone, computer, etc.) viewing the shared content of a communication session alone in their office or at home.

The system 1102 includes device(s) 1110. The device(s) 1110 and/or other components of the system 1102 can include distributed computing resources that communicate with one another and/or with the client computing devices 1106(1) through 1106(N) via the one or more network(s) 1108. In some examples, the system 1102 may be an independent system that is tasked with managing aspects of one or more communication sessions such as communication session 1104. As an example, the system 1102 may be managed by entities such as SLACK, WEBEX, GOTOMEETING, GOOGLE HANGOUTS, etc.

Network(s) 1108 may include, for example, public networks such as the Internet, private networks such as an institutional and/or personal intranet, or some combination of private and public networks. Network(s) 1108 may also include any type of wired and/or wireless network, including but not limited to local area networks ("LANs"), wide area networks ("WANs"), satellite networks, cable networks, Wi-Fi networks, WiMax networks, mobile communications networks (e.g., 3G, 4G, and so forth) or any combination thereof. Network(s) 1108 may utilize communications protocols, including packet-based and/or datagram-based protocols such as Internet protocol ("IP"), transmission control protocol ("TCP"), user datagram protocol ("UDP"), or other types of protocols. Moreover, network(s) 1108 may also include a number of devices that facilitate network communications and/or form a hardware basis for the networks, such as switches, routers, gateways, access points, firewalls, base stations, repeaters, backbone devices, and the like.

In some examples, network(s) 1108 may further include devices that enable connection to a wireless network, such as a wireless access point ("WAP"). Examples support connectivity through WAPs that send and receive data over various electromagnetic frequencies (e.g., radio frequencies), including WAPs that support Institute of Electrical and Electronics Engineers ("IEEE") 802.11 standards (e.g., 802.11g, 802.11n, 802.11ac and so forth), and other standards.

In various examples, device(s) 1110 may include one or more computing devices that operate in a cluster or other grouped configuration to share resources, balance load, increase performance, provide fail-over support or redundancy, or for other purposes. For instance, device(s) 1110 may belong to a variety of classes of devices such as traditional server-type devices, desktop computer-type devices, and/or mobile-type devices. Thus, although illustrated as a single type of device or a server-type device, device(s) 1110 may include a diverse variety of device types and are not limited to a particular type of device. Device(s) 1110 may represent, but are not limited to, server computers, desktop computers, web-server computers, personal computers, mobile computers, laptop computers, tablet computers, or any other sort of computing device.

A client computing device (e.g., one of client computing device(s) 1106(1) through 1106(N)) may belong to a variety of classes of devices, which may be the same as, or different from, device(s) 1110, such as traditional client-type devices, desktop computer-type devices, mobile-type devices, special purpose-type devices, embedded-type devices, and/or wearable-type devices. Thus, a client computing device can include, but is not limited to, a desktop computer, a game console and/or a gaming device, a tablet computer, a personal data assistant ("PDA"), a mobile phone/tablet hybrid, a laptop computer, a telecommunication device, a computer navigation type client computing device such as a satellite-based navigation system including a global positioning system ("GPS") device, a wearable device, a virtual reality ("VR") device, an augmented reality ("AR") device, an implanted computing device, an automotive computer, a network-enabled television, a thin client, a terminal, an Internet of Things ("IoT") device, a work station, a media player, a personal video recorder ("PVR"), a set-top box, a camera, an integrated component (e.g., a peripheral device) for inclusion in a computing device, an appliance, or any other sort of computing device. Moreover, the client computing device may include a combination of the earlier listed examples of the client computing device such as, for example, desktop computer-type devices or a mobile-type device in combination with a wearable device, etc.

Client computing device(s) 1106(1) through 1106(N) of the various classes and device types can represent any type of computing device having one or more data processing unit(s) 1112 operably connected to computer-readable media 1184 such as via a bus 1116, which in some instances can include one or more of a system bus, a data bus, an address bus, a PCI bus, a Mini-PCI bus, and any variety of local, peripheral, and/or independent buses.

Executable instructions stored on computer-readable media 1194 may include, for example, an operating system 1119, a client module 1120, a profile module 1122, and other modules, programs, or applications that are loadable and executable by data processing units(s) 1192.

Client computing device(s) 1106(1) through 1106(N) may also include one or more interface(s) 1124 to enable communications between client computing device(s) 1106(1) through 1106(N) and other networked devices, such as device(s) 1110, over network(s) 1108. Such network interface(s) 1124 may include one or more network interface controllers (NICs) or other types of transceiver devices to send and receive communications and/or data over a network. Moreover, client computing device(s) 1106(1) through 1106(N) can include input/output ("I/O") interfaces (devices) 1126 that enable communications with input/output devices such as user input devices including peripheral input devices (e.g., a game controller, a keyboard, a mouse, a pen, a voice input device such as a microphone, a video camera for obtaining and providing video feeds and/or still images, a touch input device, a gestural input device, and the like) and/or output devices including peripheral output devices (e.g., a display, a printer, audio speakers, a haptic output device, and the like). FIG. 11 illustrates that client computing device 1106(1) is in some way connected to a display device (e.g., a display screen 1129(1)), which can display a UI according to the techniques described herein.

In the example environment 1100 of FIG. 11, client computing devices 1106(1) through 1106(N) may use their respective client modules 1120 to connect with one another and/or other external device(s) in order to participate in the communication session 1104, or in order to contribute activity to a collaboration environment. For instance, a first user may utilize a client computing device 1106(1) to communicate with a second user of another client computing device 1106(2). When executing client modules 1120, the users may share data, which may cause the client computing device 1106(1) to connect to the system 1102 and/or the other client computing devices 1106(2) through 1106(N) over the network(s) 1108.

The client computing device(s) 1106(1) through 1106(N) may use their respective profile modules 1122 to generate participant profiles (not shown in FIG. 11) and provide the participant profiles to other client computing devices and/or to the device(s) 1110 of the system 1102. A participant profile may include one or more of an identity of a user or a group of users (e.g., a name, a unique identifier ("ID"), etc.), user data such as personal data, machine data such as location (e.g., an IP address, a room in a building, etc.) and technical capabilities, etc. Participant profiles may be utilized to register participants for communication sessions.

As shown in FIG. 11, the device(s) 1110 of the system 1102 include a server module 1130 and an output module 1132. In this example, the server module 1130 is configured to receive, from individual client computing devices such as client computing devices 1106(1) through 1106(N), media streams 1134(1) through 1134(N). As described above, media streams can comprise a video feed (e.g., audio and visual data associated with a user), audio data which is to be output with a presentation of an avatar of a user (e.g., an audio only experience in which video data of the user is not transmitted), text data (e.g., text messages), file data and/or screen sharing data (e.g., a document, a slide deck, an image, a video displayed on a display screen, etc.), and so forth. Thus, the server module 1130 is configured to receive a collection of various media streams 1134(1) through 1134(N) during a live viewing of the communication session 1104 (the collection being referred to herein as "media data 1134"). In some scenarios, not all of the client computing devices that participate in the communication session 1104 provide a media stream. For example, a client computing device may only be a consuming, or a "listening", device such that it only receives content associated with the communication session 1104 but does not provide any content to the communication session 1104.

In various examples, the server module 1130 can select aspects of the media streams 1134 that are to be shared with individual ones of the participating client computing devices 1106(1) through 1106(N). Consequently, the server module 1130 may be configured to generate session data 1136 based on the streams 1134 and/or pass the session data 1136 to the output module 1132. Then, the output module 1132 may communicate communication data 1138 to the client computing devices (e.g., client computing devices 1106(1) through 1106(3) participating in a live viewing of the communication session). The communication data 1138 may include video, audio, and/or other content data, provided by the output module 1132 based on content 1150 associated with the output module 1132 and based on received session data 1136.

As shown, the output module 1132 transmits communication data 1139(1) to client computing device 1106(1), and transmits communication data 1139(2) to client computing device 1106(2), and transmits communication data 1139(3) to client computing device 1106(3), etc. The communication data 1139 transmitted to the client computing devices can be the same or can be different (e.g., positioning of streams of content within a user interface may vary from one device to the next).

In various implementations, the device(s) 1110 and/or the client module 1120 can include UI presentation module 1140. The UI presentation module 1140 may be configured to analyze communication data 1139 that is for delivery to one or more of the client computing devices 1106. Specifically, the UI presentation module 1140, at the device(s) 1110 and/or the client computing device 1106, may analyze communication data 1139 to determine an appropriate manner for displaying video, image, and/or content on the display screen 1129 of an associated client computing device 1106. In some implementations, the UI presentation module 1140 may provide video, image, and/or content to a presentation UI 1146 rendered on the display screen 1129 of the associated client computing device 1106. The presentation UI 1146 may be caused to be rendered on the display screen 1129 by the UI presentation module 1140. The presentation UI 1146 may include the video, image, and/or content analyzed by the UI presentation module 1140.

In some implementations, the presentation UI 1146 may include a plurality of sections or grids that may render or comprise video, image, and/or content for display on the display screen 1129. For example, a first section of the presentation UI 1146 may include a video feed of a presenter or individual, a second section of the presentation UI 1146 may include a video feed of an individual consuming meeting information provided by the presenter or individual. The UI presentation module 1140 may populate the first and second sections of the presentation UI 1146 in a manner that properly imitates an environment experience that the presenter and the individual may be sharing.

In some implementations, the UI presentation module 1140 may enlarge or provide a zoomed view of the individual represented by the video feed in order to highlight a reaction, such as a facial feature, the individual had to the presenter. In some implementations, the presentation UI 1146 may include a video feed of a plurality of participants associated with a meeting, such as a general communication session. In other implementations, the presentation UI 1146 may be associated with a channel, such as a chat channel, enterprise teams channel, or the like. Therefore, the presentation UI 1146 may be associated with an external communication session that is different than the general communication session.

Figure 12:
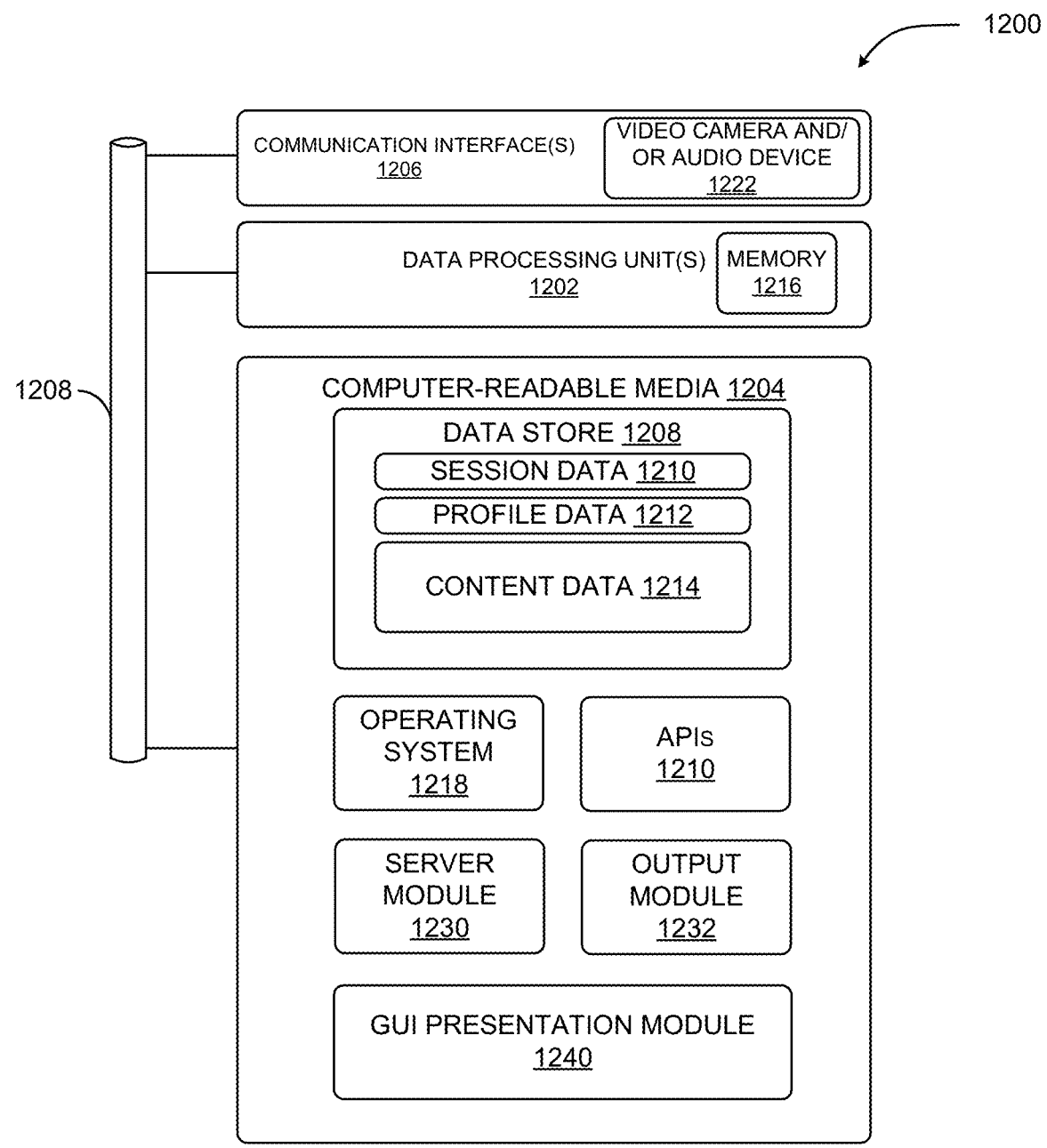
FIG. 12 is a computing architecture diagram showing aspects of the configuration and operation of a computing device that can implement aspects of the technologies disclosed herein.

FIG. 12 illustrates a diagram that shows example components of an example device 1200 (also referred to herein as a "computing device") configured to generate data for some of the user interfaces disclosed herein. The device 1200 may generate data that may include one or more sections that may render or comprise video, images, virtual objects 116, and/or content for display on the display screen 1129. The device 1200 may represent one of the device(s) described herein. Additionally, or alternatively, the device 1200 may represent one of the client computing devices 1106.

As illustrated, the device 1200 includes one or more data processing unit(s) 1202, computer-readable media 1204, and communication interface(s) 1206. The components of the device 1200 are operatively connected, for example, via a bus 1208, which may include one or more of a system bus, a data bus, an address bus, a PCI bus, a Mini-PCI bus, and any variety of local, peripheral, and/or independent buses.

As utilized herein, data processing unit(s), such as the data processing unit(s) 1202 and/or data processing unit(s) 1192, may represent, for example, a CPU-type data processing unit, a GPU-type data processing unit, a field-programmable gate array ("FPGA"), another class of DSP, or other hardware logic components that may, in some instances, be driven by a CPU. For example, and without limitation, illustrative types of hardware logic components that may be utilized include Application-Specific Integrated Circuits ("ASICs"), Application-Specific Standard Products ("ASSPs"), System-on-a-Chip Systems ("SOCs"), Complex Programmable Logic Devices ("CPLDs"), etc.

As utilized herein, computer-readable media, such as computer-readable media 1204 and computer-readable media 1194, may store instructions executable by the data processing unit(s). The computer-readable media may also store instructions executable by external data processing units such as by an external CPU, an external GPU, and/or executable by an external accelerator, such as an FPGA type accelerator, a DSP type accelerator, or any other internal or external accelerator. In various examples, at least one CPU, GPU, and/or accelerator is incorporated in a computing device, while in some examples one or more of a CPU, GPU, and/or accelerator is external to a computing device.

Computer-readable media, which might also be referred to herein as a computer-readable medium, may include computer storage media and/or communication media. Computer storage media may include one or more of volatile memory, nonvolatile memory, and/or other persistent and/or auxiliary computer storage media, removable and non-removable computer storage media implemented in any method or technology for storage of information such as computer-readable instructions, data structures, program modules, or other data. Thus, computer storage media includes tangible and/or physical forms of media included in a device and/or hardware component that is part of a device or external to a device, including but not limited to random access memory ("RAM"), static random-access memory ("SRAM"), dynamic random-access memory ("DRAM"), phase change memory ("PCM"), read-only memory ("ROM"), erasable programmable read-only memory ("EPROM"), electrically erasable programmable read-only memory ("EEPROM"), flash memory, compact disc read-only memory ("CD-ROM"), digital versatile disks ("DVDs"), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In contrast to computer storage media, communication media may embody computer-readable instructions, data structures, program modules, or other data in a modulated data signal, such as a carrier wave, or other transmission mechanism. As defined herein, computer storage media does not include communication media. That is, computer storage media does not include communications media consisting solely of a modulated data signal, a carrier wave, or a propagated signal, per se.

Communication interface(s) 1206 may represent, for example, network interface controllers ("NICs") or other types of transceiver devices to send and receive communications over a network. Furthermore, the communication interface(s) 1206 may include one or more video cameras and/or audio devices 1222 to enable generation of video feeds and/or still images, and so forth.

In the illustrated example, computer-readable media 1204 includes a data store 1208. In some examples, the data store 1208 includes data storage such as a database, data warehouse, or other type of structured or unstructured data storage. In some examples, the data store 1208 includes a corpus and/or a relational database with one or more tables, indices, stored procedures, and so forth to enable data access including one or more of hypertext markup language ("HTML") tables, resource description framework ("RDF") tables, web ontology language ("OWL") tables, and/or extensible markup language ("XML") tables, for example.

The data store 1208 may store data for the operations of processes, applications, components, and/or modules stored in computer-readable media 1204 and/or executed by data processing unit(s) 1202 and/or accelerator(s). For instance, in some examples, the data store 1208 may store session data 1210 (e.g., session data 1136), profile data 1212 (e.g., associated with a participant profile), and/or other data. The session data 1210 can include a total number of participants (e.g., users and/or client computing devices) in a communication session, activity that occurs in the communication session, a list of invitees to the communication session, and/or other data related to when and how the communication session is conducted or hosted. The data store 1208 may also include content data 1214, such as the content that includes video, audio, or other content for rendering and display on one or more of the display screens 1129.

Alternately, some or all of the above-referenced data can be stored on separate memories 1216 on board one or more data processing unit(s) 1202 such as a memory on board a CPU-type processor, a GPU-type processor, an FPGA-type accelerator, a DSP-type accelerator, and/or another accelerator. In this example, the computer-readable media 1204 also includes an operating system 1218 and application programming interface(s) 1210 (APIs) configured to expose the functionality and the data of the device 1200 to other devices. Additionally, the computer-readable media 1204 includes one or more modules such as the server module 1230, the output module 1232, and the GUI presentation module 1240, although the number of illustrated modules is just an example, and the number may vary higher or lower. That is, functionality described herein in association with the illustrated modules may be performed by a fewer number of modules or a larger number of modules on one device or spread across multiple devices.

Figure 13:
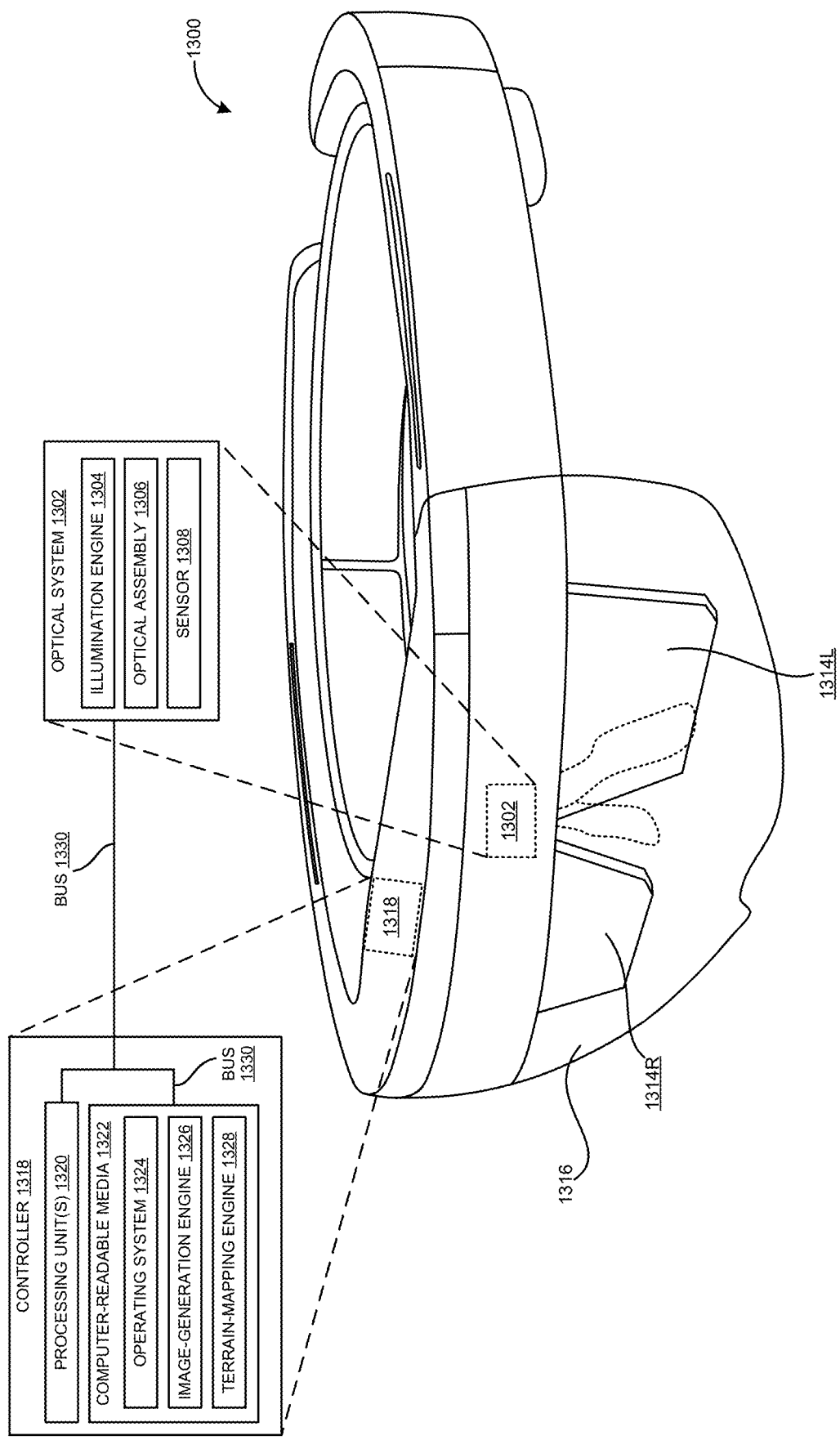
FIG. 13 is a computing device diagram showing aspects of the configuration and operation of a MR device that can implement aspects of the disclosed technologies, according to one embodiment disclosed herein.

FIG. 13 is a computing device diagram showing aspects of the configuration and operation of a computing device 1300 that can implement aspects of the systems disclosed herein. The computing device 1300 shows details of the computing device 101 shown in FIG. 1. The computing device 1300 can provide augmented reality ("AR") environments or virtual reality ("VR") environments. Generally described, AR environments superimpose computer-generated ("CG") images over a user's view of a real-world environment. For example, a computing device 1300 can generate composite views to enable a user to visually perceive a computer-generated image superimposed over a rendering of a real-world environment 112, wherein the rendering of the real-world environment 112 is created by a camera 105 directed to the real-world environment, such as a room. In some embodiments, a computing device 1300 can generate composite views to enable a user to visually perceive a computer-generated image superimposed over a direct view of a real-world environment 112. Thus, the computing device 1300 may have a prism or other optical device that allows a user to see through the optical device to see a direct view of a real-world object or a real-world environment, and at the same time, a computer-generated image superimposed over that view of a real-world object. An AR environment can also be referred to herein as a mixed reality ("MR") environment. An MR device can provide both AR and VR environments. A VR environment includes computer-generated images of a virtual environment and virtual objects. MR and AR environments can utilize depth map sensors to determine a distance between the device and a real-world object. This allows the computer to scale and position a computer-generated graphic over a real-world object in a realistic manner.

In the example shown in FIG. 13, an optical system 1302 includes an illumination engine 1304 to generate electromagnetic ("EM") radiation that includes both a first bandwidth for generating CG images and a second bandwidth for tracking physical objects. The first bandwidth may include some or all of the visible-light portion of the EM spectrum whereas the second bandwidth may include any portion of the EM spectrum that is suitable to deploy a desired tracking protocol. In this example, the optical system 1302 further includes an optical assembly 1306 that is positioned to receive the EM radiation from the illumination engine 1304 and to direct the EM radiation (or individual bandwidths thereof) along one or more predetermined optical paths.

For example, the illumination engine 1304 may emit the EM radiation into the optical assembly 1306 along a common optical path that is shared by both the first bandwidth and the second bandwidth. The optical assembly 1306 may also include one or more optical components that are configured to separate the first bandwidth from the second bandwidth (e.g., by causing the first and second bandwidths to propagate along different image-generation and object-tracking optical paths, respectively).

In some instances, a user experience is dependent on the computing device 1300 accurately identifying characteristics of a physical object 103 (a "real-world object") or plane (such as the real-world floor) and then generating the CG image in accordance with these identified characteristics. For example, suppose that the computing device 1300 is programmed to generate a user perception that a virtual gaming character is running towards and ultimately jumping over a real-world structure. To achieve this user perception, the computing device 1300 might obtain detailed data defining features of the real-world environment 112 around the computing device 1300. In order to provide this functionality, the optical system 1302 of the computing device 1300 might include a laser line projector and a differential imaging camera (both not shown in FIG. 13) in some embodiments.

In some examples, the computing device 1300 utilizes an optical system 1302 to generate a composite view (e.g., from a perspective of a user that is wearing the computing device 1300) that includes both one or more CG images and a view of at least a portion of the real-world environment 112. For example, the optical system 1302 might utilize various technologies such as, for example, AR technologies to generate composite views that include CG images superimposed over a real-world view. As such, the optical system 1302 might be configured to generate CG images via an optical assembly 1306 that includes a display panel 1314.

In the illustrated example, the display panel includes separate right eye and left eye transparent display panels, labeled 1314R and 1314L, respectively. In some examples, the display panel 1314 includes a single transparent display panel that is viewable with both eyes or a single transparent display panel that is viewable by a single eye only. Therefore, it can be appreciated that the techniques described herein might be deployed within a single-eye device (e.g. the GOOGLE GLASS AR device) and within a dual-eye device (e.g. the MICROSOFT HOLOLENS AR device).

Light received from the real-world environment 112 passes through the see-through display panel 1314 to the eye or eyes of the user. Graphical content computed by an image-generation engine 1326 executing on the processing units 1320 and displayed by right-eye and left-eye display panels, if configured as see-through display panels, might be used to visually augment or otherwise modify the real-world environment 112 viewed by the user through the see-through display panels 1314. In this configuration, the user is able to view virtual objects 104 that do not exist within the real-world environment 112 at the same time that the user views physical objects 103 within the real-world environment 112. This creates an illusion or appearance that the virtual objects 104 are physical objects 103 or physically present light-based effects located within the real-world environment 112.

In some examples, the display panel 1314 is a waveguide display that includes one or more diffractive optical elements ("DOEs") for in-coupling incident light into the waveguide, expanding the incident light in one or more directions for exit pupil expansion, and/or out-coupling the incident light out of the waveguide (e.g., toward a user's eye). In some examples, the computing device 1300 further includes an additional see-through optical component, shown in FIG. 13 in the form of a transparent veil 1316 positioned between the real-world environment 112 and the display panel 1314. It can be appreciated that the transparent veil 1316 might be included in the computing device 1300 for purely aesthetic and/or protective purposes.

The computing device 1300 might further include various other components (not all of which are shown in FIG. 13), for example, front-facing cameras (e.g. red/green/blue ("RGB"), black & white ("B&W"), or infrared ("IR") cameras), speakers, microphones, accelerometers, gyroscopes, magnetometers, temperature sensors, touch sensors, biometric sensors, other image sensors, energy-storage components (e.g. battery), a communication facility, a global positioning system ("GPS") a receiver, a laser line projector, a differential imaging camera, and, potentially, other types of sensors. Data obtained from one or more sensors 1308, some of which are identified above, can be utilized to determine the orientation, location, and movement of the computing device 1300. As discussed above, data obtained from a differential imaging camera and a laser line projector, or other types of sensors, can also be utilized to generate a 3D depth map of the surrounding real-world environment 112.

In the illustrated example, the computing device 1300 includes one or more logic devices and one or more computer memory devices storing instructions executable by the logic device(s) to implement the functionality disclosed herein. In particular, a controller 1318 can include one or more processing units 1320, one or more computer-readable media 1322 for storing an operating system 1324, and image-generation engine 1326 and a terrain-mapping engine 1328, and other programs (such as a 3D depth map generation module configured to generate the depth map data ("mesh data") in the manner disclosed herein), and data.

In some implementations, the computing device 1300 is configured to analyze data obtained by the sensors 1308 to perform feature-based tracking of an orientation of the computing device 1300. For example, in a scenario in which the object data includes an indication of a stationary physical object 103 within the real-world environment 112 (e.g., an engine), the computing device 1300 might monitor a position of the stationary object within a terrain-mapping field-of-view ("FOV"). Then, based on changes in the position of the stationary object within the terrain-mapping FOV and a depth of the stationary object from the computing device 1300, a terrain-mapping engine executing on the processing units 1320 AR might calculate changes in the orientation of the computing device 1300.

It can be appreciated that these feature-based tracking techniques might be used to monitor changes in the orientation of the computing device 1300 for the purpose of monitoring an orientation of a user's head (e.g., under the presumption that the computing device 1300 is being properly worn by a user 102). The computed orientation of the computing device 1300 can be utilized in various ways, some of which have been described above.

The processing unit(s) 1320, can represent, for example, a central processing unit ("CPU")-type processor, a graphics processing unit ("GPU")-type processing unit, an FPGA, one or more digital signal processors ("DSPs"), or other hardware logic components that might, in some instances, be driven by a CPU. For example, and without limitation, illustrative types of hardware logic components that can be used include ASICs, Application-Specific Standard Products ("ASSPs"), System-on-a-Chip Systems ("SOCs"), Complex Programmable Logic Devices ("CPLDs"), etc. The controller 1318 can also include one or more computer-readable media 1322, such as the computer-readable media described above.

It is to be appreciated that conditional language used herein such as, among others, "can," "could," "might" or "may," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example. Conjunctive language such as the phrase "at least one of X, Y or Z," unless specifically stated otherwise, is to be understood to present that an item, term, etc. may be either X, Y, or Z, or a combination thereof.

It should also be appreciated that many variations and modifications may be made to the above-described examples, the elements of which are to be understood as being among other acceptable examples. All such modifications and variations are intended to be included herein within the scope of this disclosure and protected by the following claims.

In closing, although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

What is claimed is:

1. A method for facilitating communication between a plurality of computing devices and a virtual agent, comprising:
   receiving, at a computing device of the plurality of computing devices, object data defining at least one of a real-world object or virtual object of interest displayed in a user interface in communication with the computing device;
   generating agent data defining at least one instance of a virtual agent associated with the at least one real-world object or virtual object of interest, the at least one agent instance having a database for individual objects of interest that are identified by an analysis of the object data;
   receiving communication data associated with at least one object of interest from at least one computing device of the plurality of computing devices;
   storing at least one attribute associated with the at least one object of interest from the communication data at the database of the at least one virtual agent instance, wherein the at least one attribute associated with the at least one object of interest is configured for access by multiple communication sessions;
   receiving a query interpreted from communication data from a computing device of the plurality of computing devices regarding one or more objects of interest; and
   causing the computing device to retrieve the at least one attribute associated with the one or more objects of interest from the database for display of the at least one attribute of the one or more objects of interest with a display of the communication data in response to the query.

2. The method of claim 1, wherein the at least one instance of the virtual agent is communicated to a management agent at a server to be persistently stored for access by the multiple communication sessions.

3. The method of claim 1, wherein the plurality of computing devices and the at least one instance of the virtual agent are in communication during a communication session, wherein an individual communication session of the multiple communication sessions defines parameters of a meeting.

4. The method of claim 1, wherein the data defining the at least one instance of the virtual agent is configured to persist following conclusion of a communication session for access across the multiple communication sessions.

5. The method of claim 1 wherein the instance of the virtual agent and associated database are generated during a first communication session, further comprising:
 determining that a second communication session has started; and
 in response to determining that a second communication session has started, communicating agent data defining the agent instance and the database to one or more computing devices associated with the second communication session.

6. The method of claim 1, wherein the at least one attribute is configured to persist following conclusion of a first communication session for access across the multiple communication sessions, and wherein the at least one attribute associated with the at least one object of interest is from the first communication session, and wherein the query is from a second communication session.

7. The method of claim 1, further comprising: monitoring user interaction data of a plurality of users from one or more input devices for identifying the at least one attribute, wherein the at least one attribute comprises at least one of a parameter, a keyword, an image, a model, or a description of the one or more objects of interest.

8. The method of claim 1, wherein the objects of interest are identified by:
 determining a level of interaction of input signals received from input devices with respect to the object data defining the at least one real-world object or virtual object;
 determining that the level of interaction exceeds a threshold; and
 in response to determining that the level of interaction exceeds the threshold, determining the at least one object as an object of interest.

9. A computing system comprising:
 one or more data processing units; and
 a computer readable device having encoded thereon computer-executable instructions that cause the one or more data processing units to:
  receive, at a computing device of the plurality of computing devices, object data defining at least one of a real-world object or virtual object of interest displayed in a user interface in communication with the computing device;
  generate agent data defining at least one instance of a virtual agent associated with the at least one real-world object or virtual object of interest, the at least one agent instance having a database for individual objects of interest that are identified by an analysis of the object data;
  receive communication data associated with at least one object of interest from at least one computing device of the plurality of computing devices;
  store at least one attribute associated with the at least one object of interest from the communication data at the database of the at least one virtual agent instance, wherein the at least one attribute associated with the at least one object of interest is configured for access by multiple communication sessions;
  receive a query interpreted from communication data from a computing device of the plurality of computing devices regarding one or more objects of interest; and
  cause the computing device to retrieve the at least one attribute associated with the one or more objects of interest from the database for display of the at least one attribute of the one or more objects of interest with a display of the communication data in response to the query.

10. The system of claim 9, wherein the at least one instance of the virtual agent is communicated to a management agent at a server to be persistently stored for access by the multiple communication sessions.

11. The system of claim 9, wherein the plurality of computing devices and the at least one instance of the virtual agent are in communication during a communication session, wherein an individual communication session of the multiple communication sessions defines parameters of a meeting.

12. The system of claim 9, wherein the data defining the at least one instance of the virtual agent is configured to persist following conclusion of a communication session for access across the multiple communication sessions.

13. The system of claim 9 wherein the instance of the virtual agent and associated database are generated during a first communication session, wherein the computer-executable instructions further cause the one or more data processing units to:
 determine that a second communication session has started; and
 in response to determining that a second communication session has started, communicate agent data defining the agent instance and the database to one or more computing devices associated with the second communication session.

14. The system of claim 9, wherein the at least one attribute is configured to persist following conclusion of a first communication session for access across the multiple communication sessions, and Wherein the at least one attribute associated with the at least one object of interest is from the first communication session, and wherein the query is from a second communication session.

15. A computer storage medium device having encoded thereon computer-executable instructions that cause a system to:
 receive, at a computing device of the plurality of computing devices, object data defining at least one of a real-world object or virtual object of interest displayed in a user interface in communication with the computing device;
 generate agent data defining at least one instance of a virtual agent associated with the at least one real-world object or virtual object of interest, the at least one agent instance having a database for individual objects of interest that are identified by an analysis of the object data;
 receive communication data associated with at least one object of interest from at least one computing device of the plurality of computing devices;

store at least one attribute associated with the at least one object of interest from the communication data at the database of the at least one virtual agent instance, wherein the at least one attribute associated with the at least one object of interest is configured for access by multiple communication sessions;

receive a query interpreted from communication data from a computing device of the plurality of computing devices regarding one or more objects of interest; and cause the computing device to retrieve the at least one attribute associated with the one or more objects of interest from the database for display of the at least one attribute of the one or more objects of interest with a display of the communication data in response to the query.

16. The computer storage device of claim 15, wherein the at least one instance of the virtual agent is communicated to a management agent at a server to be persistently stored for access by the multiple communication sessions.

17. The computer storage device of claim 15, wherein the plurality of computing devices and the at least one instance of the virtual agent are in communication during a communication session, wherein an individual communication session of the multiple communication sessions defines parameters of a meeting.

18. The computer storage device of claim 15, wherein the data defining the at least one instance of the virtual agent is configured to persist following conclusion of a communication session for access across the multiple communication sessions.

19. The computer storage device of claim 15, wherein the instance of the virtual agent and associated database are generated during a first communication session, wherein the computer-executable instructions further cause the system to:

determine that a second communication session has started; and in response to determining that a second communication session has started, communicate agent data defining the agent instance and the database to one or more computing devices associated with the second communication session.

20. The computer storage device of claim 15, wherein the at least one attribute is configured to persist following conclusion of a first communication session for access across the multiple communication sessions, and wherein the at least one attribute associated with the at least one object of interest is from the first communication session, and wherein the query is from a second communication session.

* * * * *